(12) United States Patent
Wong et al.

(10) Patent No.: US 8,194,995 B2
(45) Date of Patent: Jun. 5, 2012

(54) FAST CAMERA AUTO-FOCUS

(75) Inventors: Earl Quong Wong, San Jose, CA (US);
Makibi Nakamura, Tokyo (JP);
Hidenori Kushida, Yokohama (JP);
Soroj Triteyaprasert, Bangkok (TH);
Yoshihiro Murakami, Atsugi (JP);
Pingshan Li, Sunnyvale, CA (US);
Mamoru Sugiura, Kanagawa (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 918 days.

(21) Appl. No.: 12/242,805

(22) Filed: Sep. 30, 2008

(65) Prior Publication Data
US 2010/0080482 A1    Apr. 1, 2010

(51) Int. Cl.
*G06K 9/40* (2006.01)
(52) U.S. Cl. ........ 382/255; 382/264; 382/298; 382/252; 382/205; 396/104; 396/89; 396/125; 396/128; 345/589; 345/421; 345/419; 345/422; 348/42; 348/46; 348/49
(58) Field of Classification Search .................. 382/255, 382/264, 298, 252, 205; 396/104, 89, 125, 396/128; 345/589, 421, 419, 422; 348/42, 348/46, 49
See application file for complete search history.

(56) References Cited

U.S. PATENT DOCUMENTS

| | | | |
|---|---|---|---|
| 4,349,254 A | 9/1982 | Jyojki et al. | |
| 4,751,570 A | 6/1988 | Robinson | |
| 4,947,347 A | 8/1990 | Sato | |
| 4,965,840 A | 10/1990 | Subbarao | |
| 5,148,209 A | 9/1992 | Subbarao | |
| 5,170,202 A | 12/1992 | Bell | |
| 5,212,516 A * | 5/1993 | Yamada et al. | 348/354 |
| 5,231,443 A | 7/1993 | Subbarao | |
| 5,365,597 A | 11/1994 | Holeva | |
| 5,432,331 A | 7/1995 | Wertheimer | |
| 5,534,924 A | 7/1996 | Florant | |
| 5,577,130 A | 11/1996 | Wu | |
| 5,604,537 A | 2/1997 | Yamazaki et al. | |
| 5,696,848 A | 12/1997 | Patti et al. | |
| 5,703,637 A | 12/1997 | Miyazaki et al. | |
| 5,705,803 A | 1/1998 | Lisson et al. | |
| 5,752,100 A | 5/1998 | Schrock | |

(Continued)

FOREIGN PATENT DOCUMENTS
JP          8329875 A      12/1996
(Continued)

OTHER PUBLICATIONS

Pettersson, Niklas, "Online Stereo Calibration using FPGAs", http://nice.se/publications/pettersson_thesis_2005.pdf, 2005, pp. 1-6.

(Continued)

*Primary Examiner* — Mike Rahmjoo
(74) *Attorney, Agent, or Firm* — Blakely, Sokoloff, Taylor & Zafman LLP

(57) ABSTRACT

A camera auto-focuses using computed blur differences between images of a three-dimensional scene. The camera computes the blur difference between two images of the scene acquired at two different picture numbers. The camera uses the computed blur difference to predict a third picture number, where the camera uses the third picture number to auto-focus a camera lens on the scene.

13 Claims, 38 Drawing Sheets

U.S. PATENT DOCUMENTS

| | | | |
|---|---|---|---|
| 5,793,900 | A | 8/1998 | Nourbakhsh et al. |
| 6,023,056 | A | 2/2000 | Fiete et al. |
| 6,130,417 | A | 10/2000 | Hashimoto |
| 6,177,952 | B1 | 1/2001 | Tabata et al. |
| 6,219,461 | B1 | 4/2001 | Wallack |
| 6,229,913 | B1 | 5/2001 | Nayar et al. |
| 6,268,863 | B1 | 7/2001 | Rioux |
| 6,456,737 | B1 | 9/2002 | Woodfill et al. |
| 6,504,571 | B1 | 1/2003 | Narayanaswami et al. |
| 6,650,704 | B1 | 11/2003 | Carlson et al. |
| 6,677,948 | B1 | 1/2004 | Wasserman et al. |
| 6,683,652 | B1 | 1/2004 | Ohkawara et al. |
| 6,829,383 | B1 | 12/2004 | Berestov |
| 6,876,776 | B2 | 4/2005 | Recht |
| 6,891,966 | B2 | 5/2005 | Chen |
| 6,925,210 | B2 | 8/2005 | Herf |
| 7,019,780 | B1 | 3/2006 | Takeuchi et al. |
| 7,035,451 | B2 | 4/2006 | Harman et al. |
| 7,187,413 | B2 | 3/2007 | Alderson |
| 7,303,131 | B2 | 12/2007 | Carlson et al. |
| 7,340,077 | B2 | 3/2008 | Goturk et al. |
| 7,359,576 | B1 | 4/2008 | Worthington et al. |
| 7,409,103 | B2 | 8/2008 | Nishi et al. |
| 7,471,330 | B2 | 12/2008 | Okawara |
| 7,616,254 | B2 | 11/2009 | Wong et al. |
| 7,616,826 | B2 | 11/2009 | Freeman et al. |
| 7,657,119 | B1 | 2/2010 | Georgiev et al. |
| 7,711,201 | B2 | 5/2010 | Wong et al. |
| 7,801,428 | B2 | 9/2010 | Nagaishi et al. |
| 7,880,800 | B2 | 2/2011 | Sasaki et al. |
| 7,929,801 | B2 | 4/2011 | Nakamura et al. |
| 7,941,002 | B2 | 5/2011 | Samadani et al. |
| 7,941,042 | B2 | 5/2011 | Park et al. |
| 2003/0067536 | A1 | 4/2003 | Boulanger et al. |
| 2003/0231792 | A1 | 12/2003 | Zhang et al. |
| 2004/0008269 | A1 | 1/2004 | Zomet et al. |
| 2004/0027450 | A1 | 2/2004 | Yoshino |
| 2004/0036763 | A1 | 2/2004 | Swift et al. |
| 2004/0125228 | A1 | 7/2004 | Dougherty |
| 2004/0131348 | A1 | 7/2004 | Ohba et al. |
| 2004/0196379 | A1 | 10/2004 | Chen et al. |
| 2004/0252906 | A1 | 12/2004 | Liege et al. |
| 2005/0019000 | A1 | 1/2005 | Lim et al. |
| 2005/0104969 | A1 | 5/2005 | Schoelkopf et al. |
| 2005/0105823 | A1 | 5/2005 | Aoki |
| 2005/0220358 | A1 | 10/2005 | Blonde et al. |
| 2005/0265580 | A1 | 12/2005 | Antonucci et al. |
| 2006/0038891 | A1 | 2/2006 | Okutomi et al. |
| 2006/0120706 | A1 | 6/2006 | Cho et al. |
| 2006/0221179 | A1 | 10/2006 | Seo et al. |
| 2006/0256229 | A1 | 11/2006 | Wernersson |
| 2006/0285741 | A1 | 12/2006 | Subbarao |
| 2006/0285832 | A1 | 12/2006 | Huang |
| 2007/0014468 | A1 | 1/2007 | Gines et al. |
| 2007/0019883 | A1 | 1/2007 | Wong et al. |
| 2007/0036427 | A1 | 2/2007 | Nakamura et al. |
| 2007/0040924 | A1 | 2/2007 | Cho et al. |
| 2007/0189750 | A1 | 8/2007 | Wong et al. |
| 2007/0216765 | A1 | 9/2007 | Wong et al. |
| 2008/0007626 | A1 | 1/2008 | Wernersson |
| 2008/0080846 | A1 | 4/2008 | Grip |
| 2008/0089598 | A1 | 4/2008 | George et al. |
| 2008/0107411 | A1 | 5/2008 | Hope |
| 2008/0297648 | A1 | 12/2008 | Furuki et al. |
| 2009/0015681 | A1 | 1/2009 | Pipkorn |
| 2009/0074393 | A1* | 3/2009 | Park et al. ..................... 396/104 |
| 2009/0079862 | A1 | 3/2009 | Subbotin |
| 2009/0186655 | A1 | 7/2009 | Wernersson |
| 2009/0268985 | A1 | 10/2009 | Wong et al. |
| 2009/0316995 | A1 | 12/2009 | Szeliski et al. |
| 2010/0053417 | A1 | 3/2010 | Baxansky |
| 2010/0080482 | A1 | 4/2010 | Wong et al. |
| 2010/0194971 | A1 | 8/2010 | Li et al. |

FOREIGN PATENT DOCUMENTS

| | | |
|---|---|---|
| JP | 10108152 | 4/1998 |
| JP | 2002010126 A2 | 1/2002 |
| JP | 2004048644 | 12/2004 |
| TW | 233523 B | 6/2005 |
| WO | WO 02/098128 A1 | 12/2002 |
| WO | WO 2007/022329 A2 | 2/2007 |
| WO | WO 2007057808 A1 | 5/2007 |
| WO | WO 2008/147999 A1 | 12/2008 |

OTHER PUBLICATIONS

Ghita, Ovidiu and Whelan, Paul, "Real-Time 3D Estimation Using Depth from Defocus", www.vsq.dcu.ie/papers/vision_2000.pdf, 2000, Third Quarter, vol. 16, No. 3, pp. 1-6.

Alex Paul Pentland, "A New Sense for Depth of Field", 1987, pp. 1-15, IEEE.

Shang-Hong Lai, Chang-Wu Fu and Shyang Chang, "A Generalized Depth Estimation Algorithm with a Single Image", 1992, pp. 405-411, IEEE.

John Ens and Peter Lawrence, "An investigation of Methods for Determining Depth from Focus", 1993, pp. 97-108, IEEE.

Gopal Surya and Murali Subbarao, "Depth from Defocus by Changing Camera Aperture: A Spatial Domain Approach", 1993, pp. 61-67, IEEE.

Mats Gokstorp, "Computing depth from out-of-focus blur using a local frequency representation", 1994, pp. 153-158, IEEE.

Gunther Schneider, Bernard Heit, Johannes Honig, and Jacques Brémont, "Monocular Depth Perception by Evaluation of the Blur in Defocused Images", 1994, pp. 116-119, IEEE.

Murali Subbarao, Tse-Chung Wei, and Gopal Surya, "Focused Image Recovery from Two Defocused Images Recorded with Different Camera Settings", 1995, pp. 1613-1628, IEEE.

Shree K. Nayar, Masahiro Watanabe and Minori Noguchi, Real-Time Focus Range Sensor, 1996, pp. 1186-1198.

Masahiro Watanabe and Shree K. Nayar, "Minimal Operator Set for Passive Depth from Defocus", 1996, pp. 431-438, IEEE.

Johannes Honig, Bernard Heit and Jacques Bremont, "Visual Depth Perception Based on Optical Blur", 1996, pp. 721-724, IEEE.

A.N. Rajagopalan and S. Chaudhuri, "A Variational Approach to Recovering Depth From Defocused Images", 1997, pp. 1158-1164, IEEE.

D. Ziou, S. Wang and J. Vaillancourt, "Depth from Defocus Using the Hermite Transform", 1998, pp. 958-962, IEEE.

Christophe Simon and Frederique Bicking, "Estimation of depth on thick edges from sharp and blurred images", 2002, pp. 323-328, IEEE.

Ovidiu Ghita, Paul F. Whelan and John Mallon, "Computational approach for depth from defocus", Apr.-Jun. 2005 pp. 023021-1-023021-8, vol. 14(2), Journal of Electronic Imaging.

Tony Lindeberg, "On the axiomatic foundations of linear scale-space: Combining semi-group structure with causality vs. scale invariance", pp. 1-24, 1994, Computational Vision and Action Perception Laboratory (CVAP), Klumer Academic,Sweden.

B.P. Horn, "Robot Vision", 1986, pp. 18-28, MIT Press, New York,McGraw-Hill.

Yalin Xiong, Steven A. Shafer, "Depth from Focusing and Defocusing", 1993, pp. 68-73, IEEE, Pittsburgh, PA.

Kang-Sun Choi, Jun-Suk Lee and Sung-Jae Ko, "New AutoFocusing Technique Using the Frequency Selective Weighted Median Filter for Video Cameras", Jun. 28, 1999, pp. 820-827, IEEE, Korea University, Korea.

L. Firestone, K. Cook, K. Culp, N. Talsania, K. Preston Jr., "Comparison of autofocus methods for automated microscopy", Mar. 13, 2006, pp. 195-206, Department of Electrical and Computer Engineering, Carnegie Mellon University, Pittsburgh, PA.

Jie He, Rongzhen Zhou, Zhiliang Hong, "Modified fast climbing search auto-focus algorithm with adaptive step size searching technique for digital camera", May 2003, pp. 257-262, Consumer Electronics, IEEE Transactions.

Ohba, et al., "Real-Time Micro Environmental Observation With Virtual Reality", 2000, International Conference on Pattern Recognition, vol. 4, pp. 487-490.

Ohba, et al., "Microscopic Vision System With All-In-Focus and Depth Images", Dec. 2003, Machine Vision and Applications. vol. 15, Issue 2, pp. 55-62.

Darrell, et al., "Pyramid Based Depth From Focus", 1988, pp. 504-509.

Blickgesteuerte PC-Steuerung,Forschung&Entwicklung, XP-000725834, Publiation Date Aug. 4, 1997, pp. 76-78.

21st Century 3D: 3DVX3 Press Release; 21st Century 3D Introduces Uncompressed 4:4:4 Steroscopic camera System—3DVX3; San Jose Convention Center Jan. 18, 2006 SPIE Steroscopic Displays and Applications conference.

Three-dimensional Camera Phone; Smithsonian/NASA ADS Physics Abstract Service; find Similar Abstracts (with default settings below); Electronic Refereed Journal Article (HTML); Full Refereed Journal Article (PDF/Postscript); Reads History; Translate Abstract; Title: Three-dimensional Camera Phone, Authors: Iizuka, Kiego, Publications: Applied Optics IP, vol. 43, pp. 6285-6292, Publication Date: Dec. 2004, Origin: WEB, Bibliographic Code: 2004ApOpt.. 43.6285I.

Real-time view interpolation system for a super multiview 3D display; processing; Smithsonian/NASA ADS Physics Abstract Service; find Similar Abstracts (wtih default settings below); Table of Contents; Also-Read Articles (Reads History); Translate Abstract; Title: Real-Time view interpolastion system for a super multiview 3D display; processsing implementation and evalutalon; Authors: Hamaguchi, Tadahiko, Fujii, Toshiaki; Honda, Toshio; Affiliation: AA (Telecommunications Advancement Organization of Japan) AB (Telecommunications Advancement Organization of Japan and Nagoya Univ.) AC (Telecommunications Advancement Organization of Japan and Chiba Univer.); Publication; Proc. SPIE vol. 4660, p. 105-115, Steroscopic Displays and Virtual Reality Systems, IX, Andrew J. Woods; John O. Merritt; Stephen A. Benton; Mark T. Bolas; Eds. (Spie Homepage); Publication Date: May 2002; Origin: SPIE; Abstract Copyright: 2002 SPIE—The Internantion Society for Optical Engineering, Downloading of the abstract is permitted for personal use only; Code: 2002SPIE.4600..105H.

Klaus Berthold, Paul Horn, "Robot Vision", 1986, pp. 1-509.

Tony Lindeberg, "Scale-Space Theory: A Basic Tool for Analysing Structures At Different Scales", Journal of Applied Statistics, vol. 21, No. 2, pp. 225-270, 1994.

Wong, Earl, "A New Method for Creating a Depth Map for Camera Auto Focus Using an All in Focus Picture and 2D Scale Space Matching", Acoustics, Speech and Signal Processing, 2006. ICASSP 2006 Proceedings. 2006 IEEE International Conference on vol. 3, May 14-19, 2006 pp. III-1184-III-1187.

Chiang, Ming-Chao and Boult, Terrance E., "Local Blur Estimation and Super Resolution," 1997 IEEE CVPR Proceedings, 6 pages.

Huang, Mao-Yu, Tseng, Din-Chang and Liu, Michael S.C., "Wavelet Image Enhancement Based on Teager Energy Operator," IEEE, 2002, pp. 993-996.

Ziou, D. et al., "Depth from Defocus Estimation in Spatial Domain", Computer Vision and Image Understanding, vol. 81, No. 2, Feb. 1, 2001. pp. 143-165.

M. Baba et al, "A thin lens based camera model for depth estimation from defocus and translation by zooming.", Proceeding of the 15$^{th}$ International Conference on Vision Interface, Calgary, Canada (2002).

Krivanek, J. et al.—"Fast Depth of Field Rendering with Surface Splatting"—Proceedings from Computer Graphics International 2003.

Subbarao et al., "Depth from Defocus: A Spatial Domain Approach", International Journal of Computer Vision, vol. 13, No. 3, pp. 271-294, 1994.

Tsai et al., "A Moment-Preserving Approach for Depth from Defocus", Pattern Recognition, vol. 31, No. 5, pp. 551-560, 1998.

Xian, Tao et al.—"Depth-from-Defocus: Blur Equalization Technique"—Proc. of SPIE, vol. 6382, 2006, pp. 63820E-1-63820E-10.

Deschenes, F. et al.—"Simultaneous Computation of Defocus Blur and Apparent Shifts in Spatial Domain"—15th International Conf. on Vision Interface, May 27-29, 2002, Calgary, Canada.

Leroy, Jean-Vincent et al.—"Real Time Monocular Depth from Defocus"—Lecture Notes in Computer Science, vol. 5099, proc. of the 3rd International conf. on Image and Signal Processing, pp. 103-111, 2008.

Gokstorp, Mark—"Computing depth from out-of-focus blur using a local frequency representation"—Proc. of the 12th IAPR International Conf. on Pattern Recognition, vol. 1, Conf. A: Computer Vision & Image Processing, vol. 1, Oct. 9-13, 1994, Jerusalem.

Park, Soon-Yong—"An image-based calibration technique of spatial domain depth-from-defocus"—Pattern Recognition Letters, vol. 27, 2006, pp. 1318-1324.

Zhang, Quanbing et al.—"A Novel Technique of Image-Based Camera Calibration in Depth-from-Defocus"—First International Conf. on Intelligent Networks and Intelligent Systems, Nov. 1-3, 2008, pp. 483-486.

Yuan, L. et al., "Blurred/Non-Blurred Images Alignment Using Sparseness Prior"—IEEE 11$^{th}$ Int. Conf. on Computer Vision, Oct. 14-17, 2007, Rio de Janeiro, pp. 1-8.

Lee, S. et al. "Real-time Depth-of-Field Rendering Using Point Splatting on Per-Pixel Layers"—Pacific Graphics, vol. 27, No. 7, pp. 1955-1962, 2008.

Kraus, M. "Quasi-Convolution Pyramidal Blurring"—GRAPP 2008, Proc. of the 3rd Inter. Conf. on Comp. Graphics Theory and Applications, pp. 155-162, Portugal, Jan. 22-25, 2008.

Korean Intellectual Property Office, International Search Report and Written Opinion, counterpart PCT Application No. PCT/US2011/024832, including claims searched, Sep. 22, 2011, pp. 1-14.

European Patent Office, Extended Search Report, Issued on Feb. 24, 2011, including claims searched for corresponding EPO patent application No. 10190445.6, claiming priority to U.S. Appl. No. 12/643,802, pp. 1-10.

European Patent Office, Extended European Search Report, EP application No. 10 15 0104—counterpart to U.S. Appl. No. 12/363,511, issued May 20, 2010.

U.S. Appl. No. 12/242,805 (not yet published)—filed Sep. 30, 2008—"Fast Camera Auto-Focus".

Yao, Yi, et al.—"Auto-focusing in extreme zoom surveillance: a system approach with application to faces"—Advances in Visual Computing, Second International Symposium, ISVC 2006, Lake Tahoe, NV, USA; Nov. 6-8, 2006.

* cited by examiner

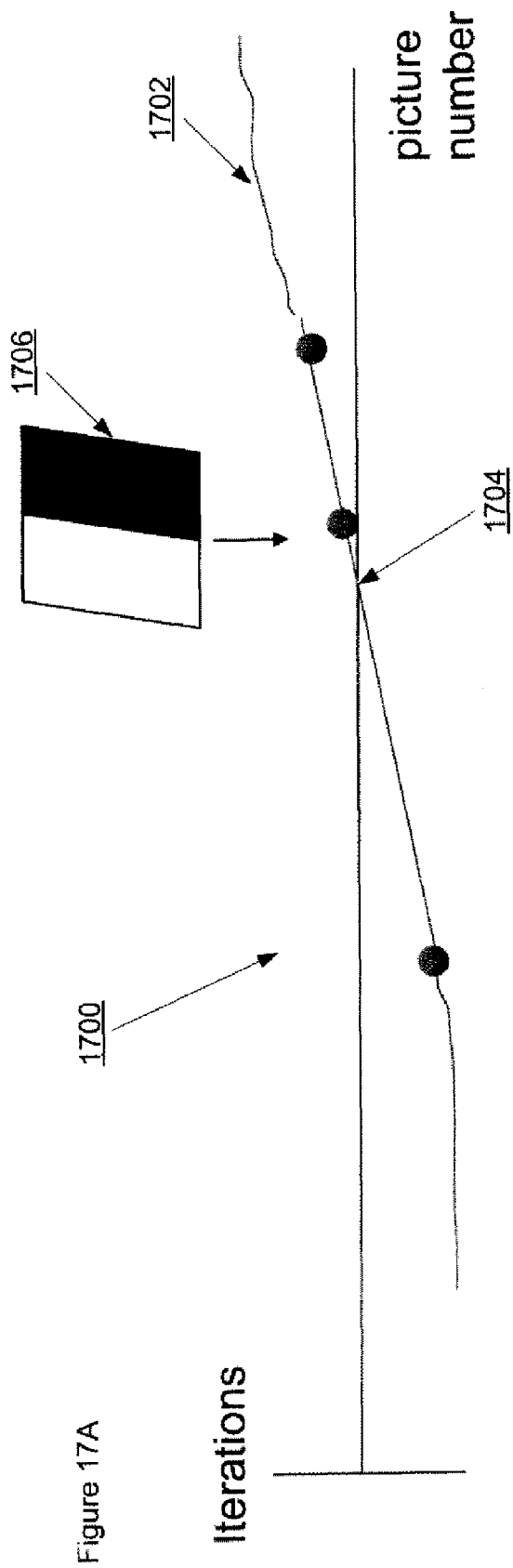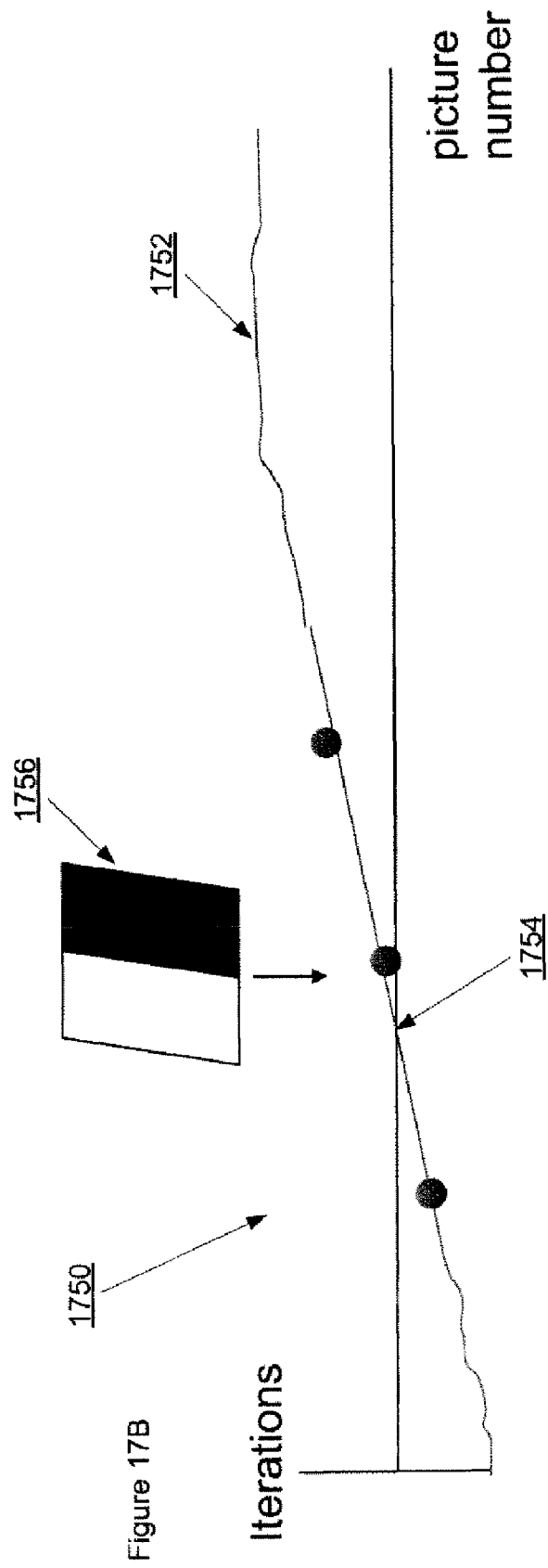

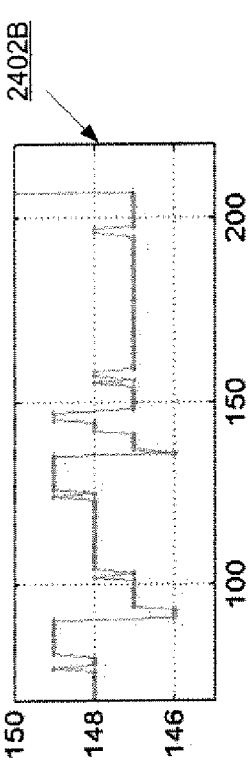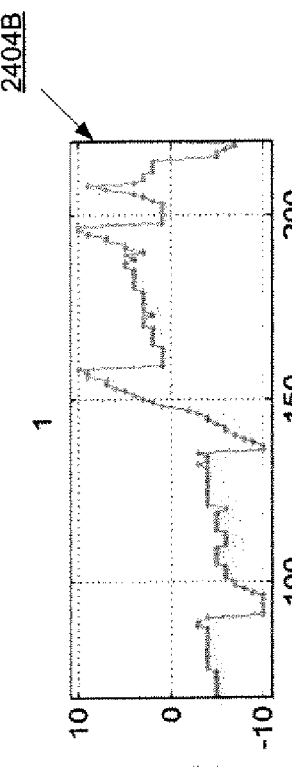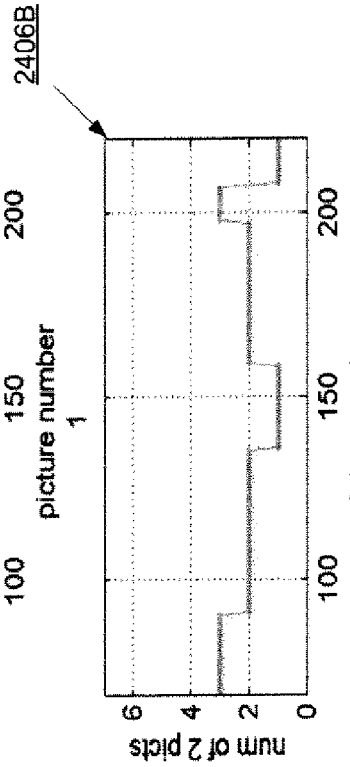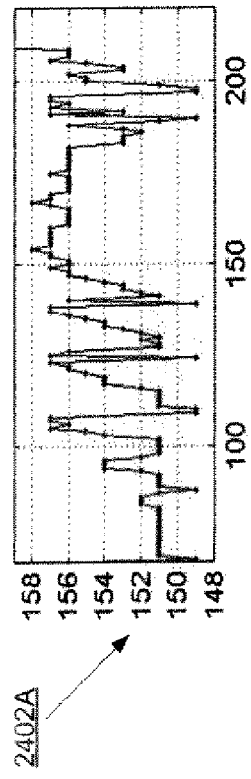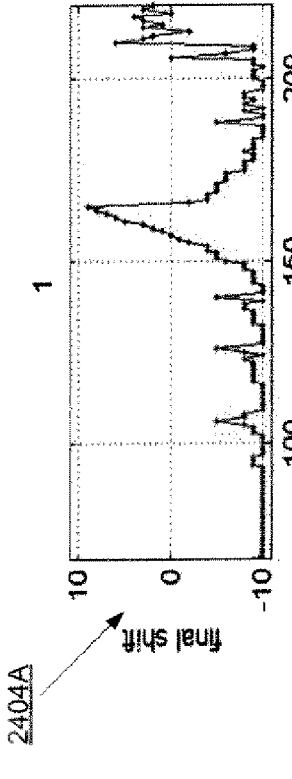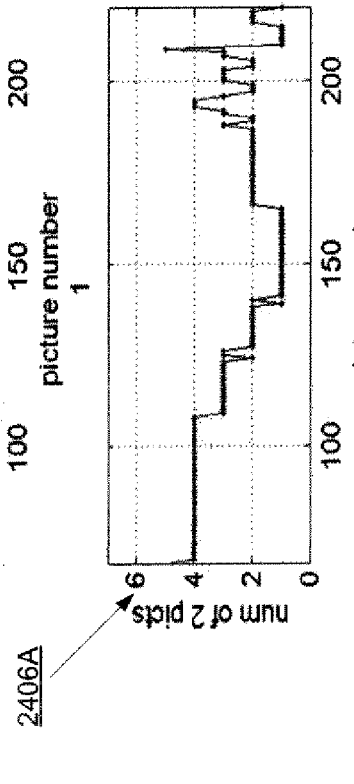
FIGURE 24

FAST CAMERA AUTO-FOCUS

RELATED APPLICATIONS

This patent application is related to the co-pending U.S. patent applications, entitled "METHOD AND APPARATUS FOR GENERATING A DEPTH MAP UTILIZED IN AUTO-FOCUSING", application Ser. No. 11/473,694, and "REDUCED HARDWARE IMPLEMENTATION FOR A TWO-PICTURE DEPTH MAP ALGORITHM", application Ser. No. 12/111,548. The related co-pending applications are assigned to the same assignee as the present application.

FIELD OF INVENTION

This invention relates generally to image acquisition, and more particularly to a fast camera auto-focus.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright©2007, Sony Electronics, Incorporated, All Rights Reserved.

BACKGROUND

Auto-focus in a camera automatically focuses a camera lens on a three-dimensional scene, without the need for the camera user to manually focus the camera lens. There are many auto-focus schemes known in the art. A traditional auto-focus scheme searches for the peak of the auto-focus curve (e.g., peak-hold-integrate method, hill-climbing, etc.). Typically, there is a different auto-focus curve for different camera optical settings (camera type, lens type, aperture, focal length, shutter speed, film or sensor speed, etc.). In addition, the auto-focus curve will be a function of the scene itself and the region analyzed. In one embodiment, a camera employs a hill climbing scheme that computes the auto-focus curve from image gradients. As the region of analysis becomes more and more in focus, the image gradients will become larger and larger. The objective of the auto-focus algorithm is to reach the peak of the auto-focus curve using a minimum number of camera focus positions. In general, hill-climbing auto-focus schemes require a large number of pictures of the three-dimensional scene in order to converge to the desired focus position.

SUMMARY

A camera auto-focuses on a three-dimensional scene using computed blur differences between different images of that scene. The camera computes the blur difference between two images of the scene acquired at two different focus positions. The camera uses the computed blur difference for a given scene location to predict a new focus position. This procedure repeats until focus is achieved at the given scene location.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings in which like references indicate similar elements.

FIGS. 17A-B are graphs illustrating shifting plots of blur differences versus reference picture number.

FIGS. 24-30 are graphs illustrating fast auto-focus convergence results for the different image masks of FIG. 23.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other differences may be made without departing from the scope of the present invention. The following detailed description is, therefore, not to be taken in a limiting sense, and the scope of the present invention is defined only by the appended claims.

As described above, a traditional auto-focus scheme searches for the peak of the auto-focus curve (e.g., peak-hold-integrate method, hill-climbing, etc.). The auto-focus information contained in the curve is a qualitative measure of image defocus, or blurring, and an auto-focus scheme attempts to minimize image blurring. Because an auto-focus scheme measures qualitative blurring and blurring is related to depth, the auto-focus curve contains depth information. This is because the peak of the curve corresponds to the in-focus position. For example, consider the case where the scene consists of a single object on a constant background. If the depth of the object is also known, the camera could predict a focus position at which the object is in focus. As described below with reference to FIG. 3, because blur differences are related to depth, blur differences can be used in an auto-focus scheme to determine the picture that is in-focus, or equivalently, the focus position for the three dimensional scene.

Figure 1:
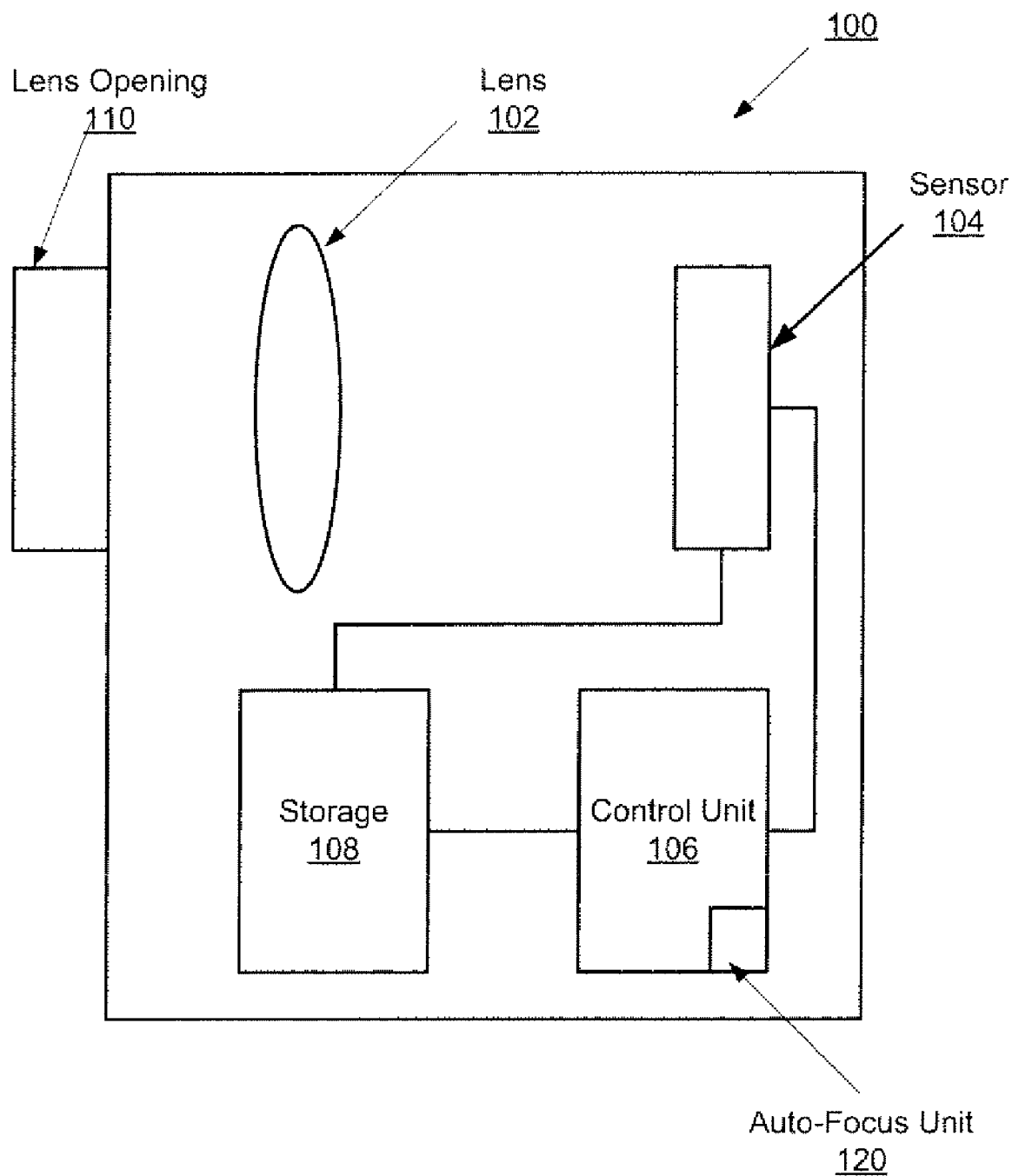
FIG. 1 illustrates one embodiment of an imaging system 100.

FIG. 1 illustrates one embodiment of camera 100. In FIG. 1, camera 100 comprises lens 102, sensor 104, control unit 106, storage 108, and lens opening 110. Camera 100 may be digital or film still camera, video camera, surveillance camera, robotic vision sensor, image sensor, etc. Sensor 104 captures an image of a scene through lens 102. In one embodiment, camera 100 comprises one sensor. Alternatively, camera 100 can have multiple sensors at different focusing distance from test subject.

Sensor 104 can acquire a still picture, such as in a digital or film still camera, or acquire a continuous picture, such as a video or surveillance camera. In addition, sensor 104 can acquire the image based on different color models used in the art, such as Red-Green-Blue (RGB), Cyan, Magenta, Yellow, Green (CMYG), etc. Control unit 106 typically manages the sensor 104 automatically and/or by operator input. Control unit 106 configures operating parameters of the sensor 104 and lens 102 such as, but not limited to, the lens focal length, f, the aperture of the lens, A, lens focus position, and (in still cameras) the lens shutter speed. In addition, control unit 106 may incorporate an auto-focus unit 120 (shown in phantom) that controls the automatic focusing of lens 102 on the scene. Embodiments of this invention are incorporated into auto-focus unit 120. The image(s) acquired by sensor 104 are stored in the image storage 108.

Figure 2A:
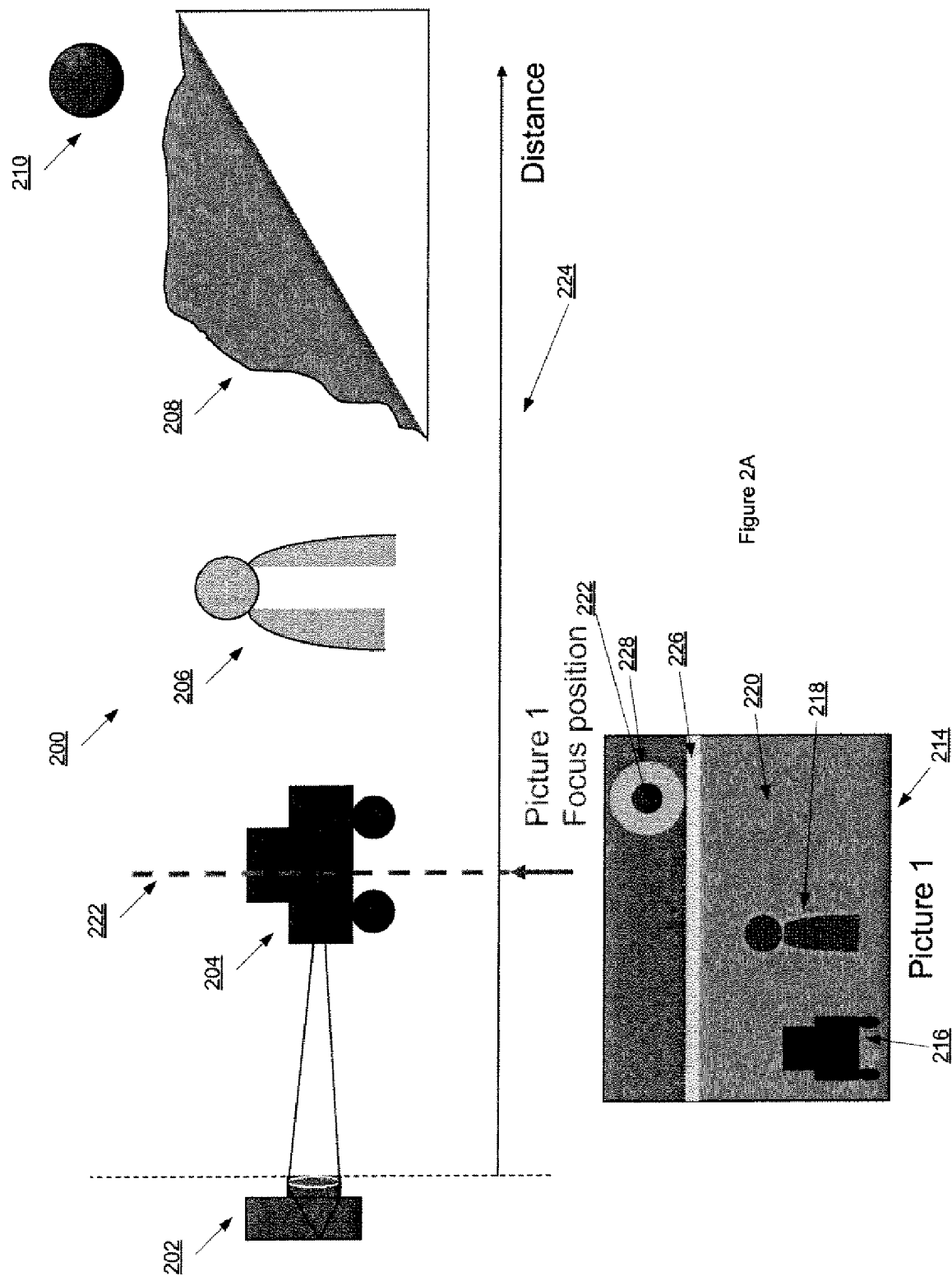
FIG. 2A illustrates one embodiment of a picture of a three dimensional scene.

FIG. 2A illustrates one embodiment of a picture of a three dimensional scene. In FIG. 2, camera 202 prepares to take a picture by focusing on three-dimensional scene 200. In one embodiment, camera 202 is camera 100 as illustrated in FIG. 1. Three-dimensional scene 200 comprises car 204, person 206, mountain backdrop 208, and sun 210. Each of the objects in three-dimensional scene 200 is at different distances from camera 202. For example, based on distance scale 224, car 204 is closest to camera 202, followed in order by person 206, mountain backdrop 208, and sun 210. With camera focusing on car 204 at distance 222, objects at distances other than distance 222, specifically, greater than or equal to 1 DOF (depth of field) from the distance 222, will not be in focus. For example, at certain camera settings with camera 202 focusing on car 204, the image resulting from this setting would result with a blurred person 206. Similarly, mountain backdrop 208 and sun 210 would be blurry as well because these objects are farther still from car 204.

Picture 214 illustrates this result. In picture 214, car 216 is in focus and not blurry. Blurriness in picture 214 is represented with a thicker border for each object in the picture. In this example, car 216 has a relatively thin border. Person 218 has a thicker border. Mountain backdrop 220 has a thicker border 226 and sun 222 has the thickest border, 228. This represents that sun 222 is blurrier than mountain backdrop 220, which is blurrier than person 218, which in turn is blurrier than car 216.

Figure 2B:
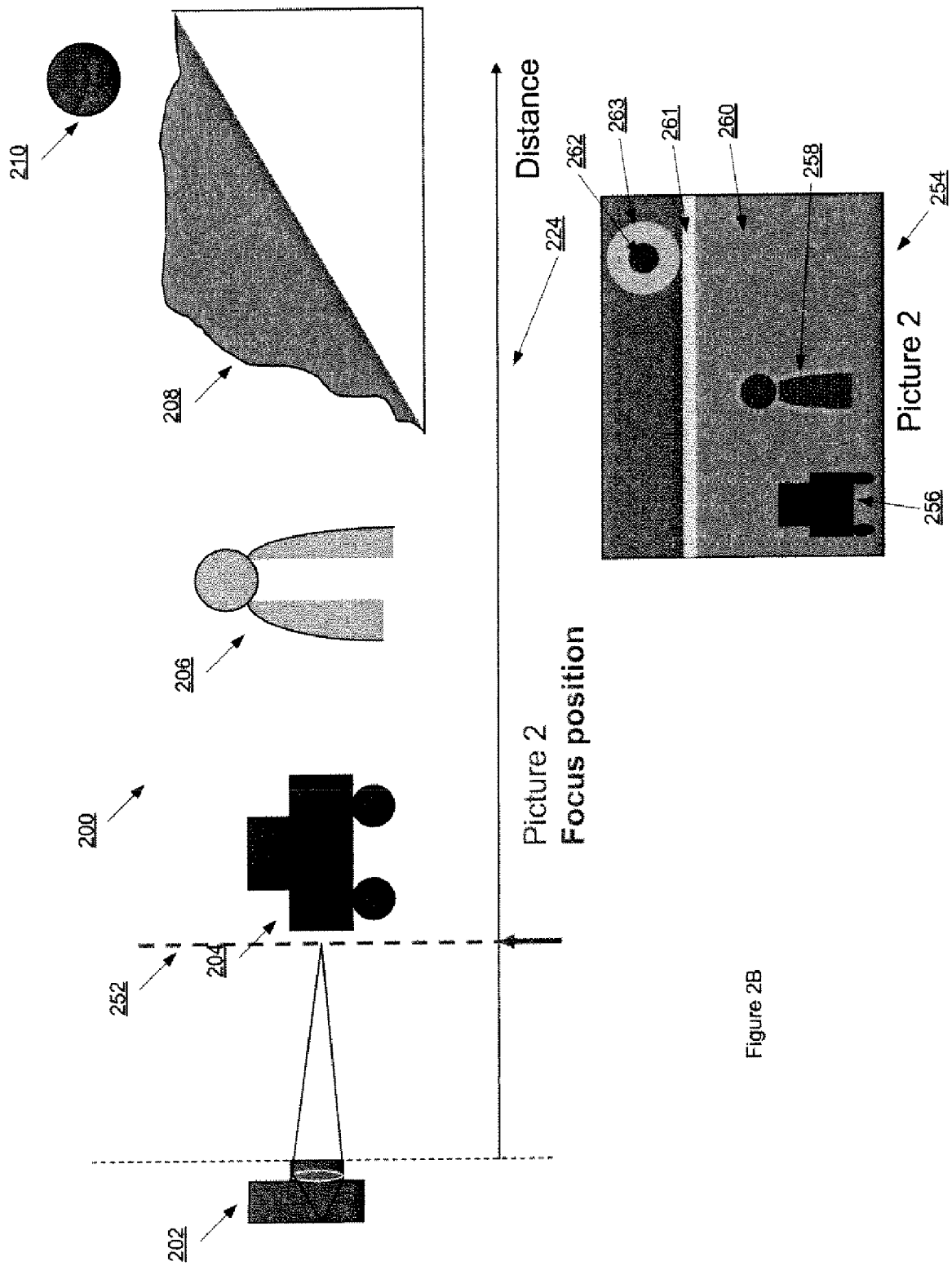
FIG. 2B illustrates one embodiment of another picture of the three dimensional scene.

FIG. 2B illustrates one embodiment of another picture 254 of the three dimensional scene 200 with a different focus position of camera 202. In FIG. 2B, camera 202 focus position 252 is before car 204, specifically, greater than or equal to 1 DOF (depth of field) from distance 222. Thus, the image of car 204 in picture 254 is blurrier than in the picture 214. As in picture 214, picture 254 comprises person 258, mountain backdrop 260, and sun 262. While in picture 254, car 256 is blurry with a slightly thicker border as compared with the focused car 216 in picture 214. Thus, there is a blur difference between car 216 in picture 214 and car 256 in picture 254 based on the different focus positions of camera 202. Person 258, mountain backdrop 260 (with border 261), and sun 262 (with border 263) also have a blur difference. Each of the objects in picture 254 has thicker border than those in picture 214, indicating that these objects are more blurred than those in picture 214.

Figure 3:
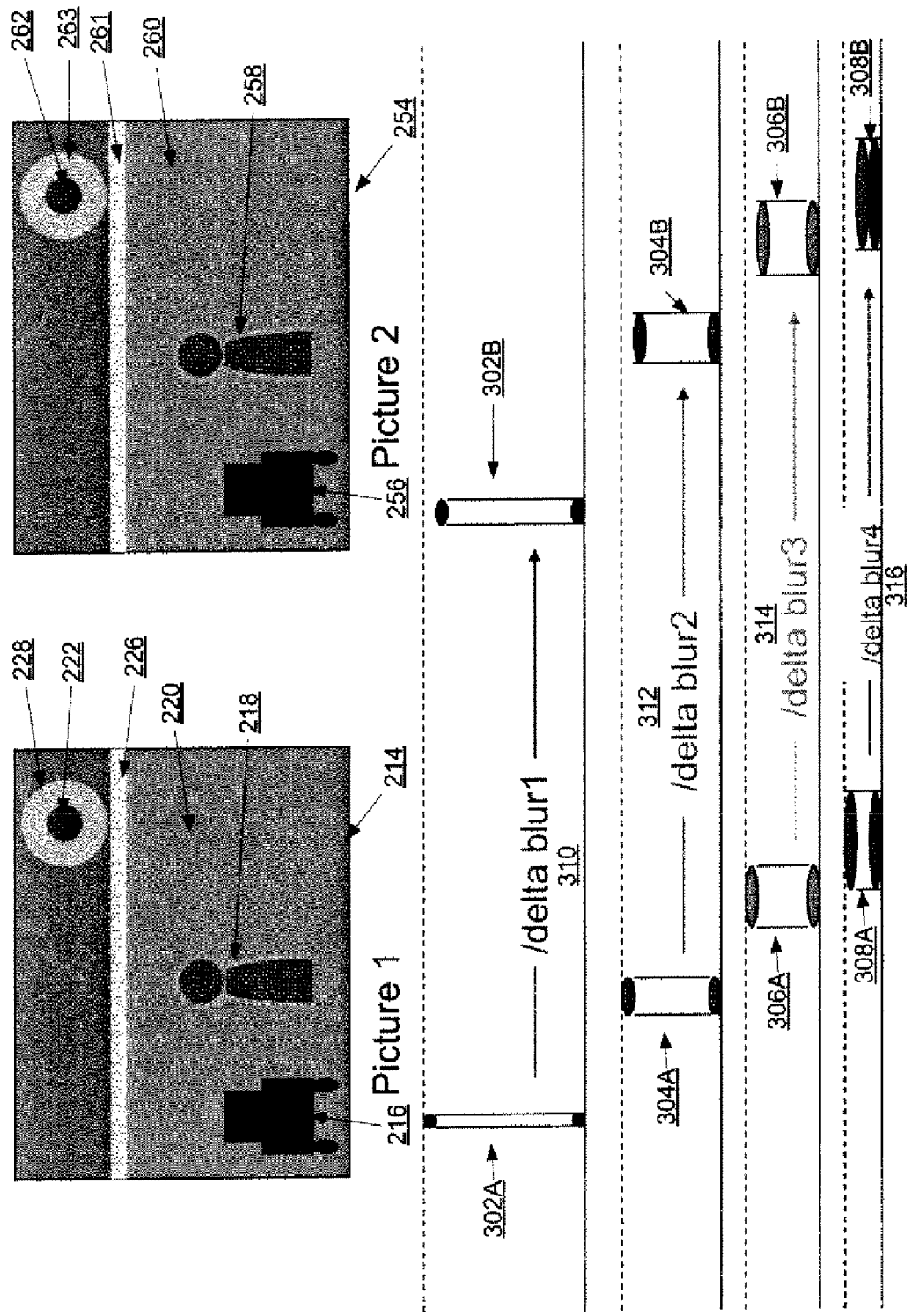
FIG. 3 illustrates blur differences of objects in the two pictures.

FIG. 3 illustrates the absolute blur for different objects in FIGS. 2A and 2B using pillboxes of different shapes. The blur difference between car 216 in picture 214 and car 256 in picture 254 can be seen by examining the difference heights and widths of the two pillboxes shown in 302A-B. This blur difference results because two different focus positions were used to capture the pictures of FIGS. 2A and 2B. A pillbox is mathematical mask used to represent the blurring of an object in an image. As is known in the art, a pillbox is a blur convolution consisting of equal valued pixels in a circular area centered on a reference pixel. A tall thin pillbox represents an object that has undergone less blurring versus a shorter, squatter pillbox. In this Figure, pillbox 302A is taller and thinner than pillbox 302B. Because pillbox 302A is taller than pillbox 302B, there is a blur difference between the two pillboxes, represented by delta blur 310. Delta blur 310 is used for fast auto focus, and to obtain distance information for the object.

In addition, FIG. 3 also illustrates blur differences for the other objects in picture 214 and picture 254. In FIG. 3, the blur difference 312 (labeled "delta blur2") is the difference between blurs 304A-B for person 218 in picture 214 and person 258 in picture 254, respectively. Blur difference 314 (labeled "delta blur3") is the difference between blurs 306A-B for mountain backdrop 220 in picture 214 and mountain backdrop 260 in picture 254, respectively. Blur difference 316 (labeled "delta blur4") is the difference between blurs 308A-B for sun 222 in picture 214 and sun 262 in picture 254, respectively.

As illustrated in FIG. 3, because of the different focus positions, a blur difference exists for the different objects in the scene. This quantity will be referred to herein as the blur difference. The amount of blur difference depends on the two focus positions. This blur difference is related to the depth of the object (Equation (1)):

$$\text{Depth}_{car} = f(fl, F_{number}, D1, D2, \Delta \text{blur}_{car})$$

$$\text{Depth}_{person} = f(fl, F_{number}, D1, D2, \Delta \text{blur}_{person})$$

$$\text{Depth}_{mountain} = f(fl, F_{number}, D1, D2, \Delta \text{blur}_{mountain})$$

$$\text{Depth}_{sun} = f(fl, F_{number}, D1, D2, \Delta \text{blur}_{sun}) \quad (1)$$

where f is the function that relates blur difference to depth, fl is the focal length of the lens, $F_{number}$ is the f-number of the lens, D1 and D2 are the distances between the lens and the image sensor for two different focus positions, and Δblur is the computed blur difference for a specific picture location. As stated previously, the blur difference results from capturing two pictures using two different focus positions.

Figure 4:
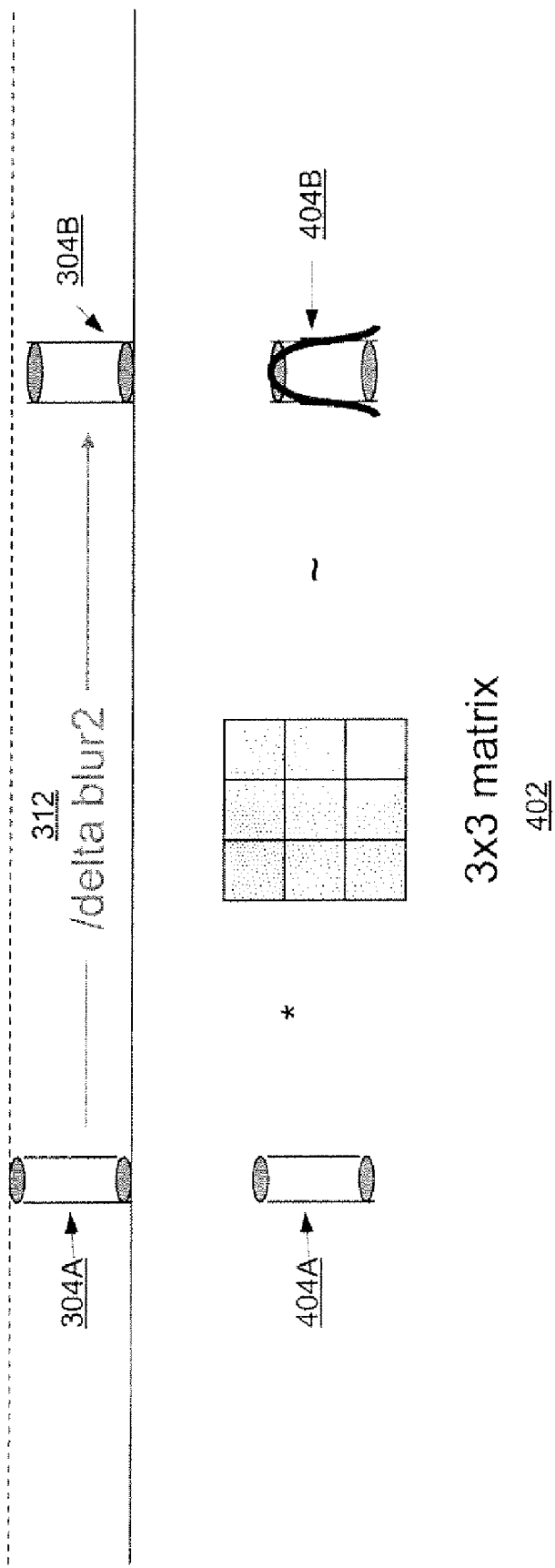
FIG. 4 illustrates modeling the blur difference between an object in the two pictures.

FIG. 4 illustrates the modeling and the computation of the blur difference 312 between an object in the two pictures in FIGS. 2A and 2B. In FIG. 4, blur difference 312 (labeled "delta blur2") is computed by applying a 3×3 matrix 402 between blur models 404A-B. Blur models 404A-B can be Gaussian functions, pillbox functions, or other blur models known in the art. In one embodiment, blur models 404A-B are Gaussian functions and 3×3 matrix 402 is a blurring matrix that blurs blur model 404A into 404B. 3×3 matrix 402 can be applied to blur model 404A once or many times depending on the amount blurring needed to convolve blur model 404A into blur model 404B. In one embodiment, 3×3 matrix 402 represents blurring of one blur unit. 3×3 matrix 402 is also referred to as a blur kernel. In general, the blur kernel is of dimension n×n, where n is an integer. In one embodiment, the blur kernel is applied via convolution repeatedly on the sharper image until a new image is produced that closely matches the more blurred image. Qualitatively, this is illustrated by the smooth, black curve on blur model 404B. This black curve closely approximates the pillbox 304B after the blur kernel has been applied m times. The number of times the blur kernel has been applied is also called the iterations number.

Figure 5A:
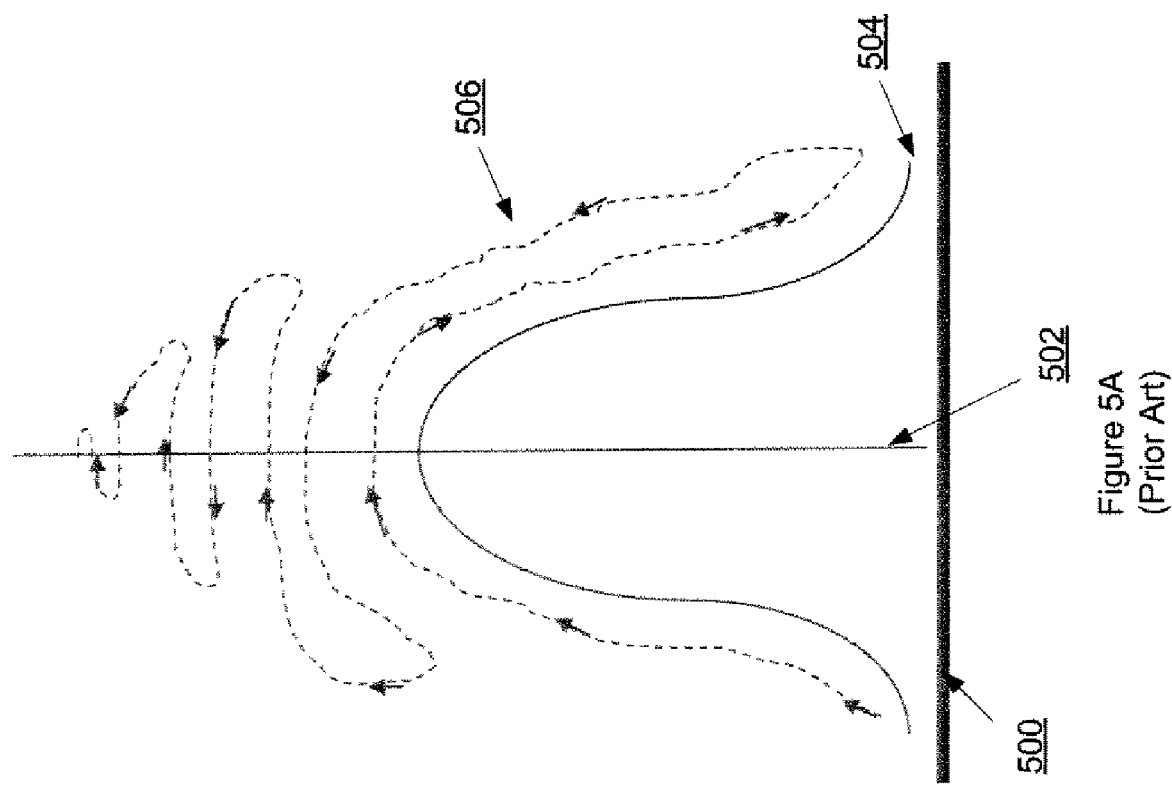
FIG. 5A (prior art) is a graph of the auto-focus hill-climbing algorithm.

FIG. 5A (prior art) is a graph of the auto-focus hill-climbing algorithm. This algorithm finds the peak of auto-focus curve by calculating gradient information in the given scene. However, this algorithm can require up to forty or greater pictures in order to converge on a focused image. For example, in FIG. 5A, curve 504 represents the auto-focus curve for a location in a scene. Point 502 represents the picture number corresponding to the in focus position of curve 504. The in focus position is identified by the peak of curve 504. Different points 500 on curve 504 are different picture numbers for a given camera setting. In one embodiment, a picture number is a measure of the focus distance, or focus position, of the lens on camera 100. Picture numbers can be a numbered sequence representing different focus distances. For example, a sequence of picture numbers for a particular lens combination can be focusing distance of 35, 40, 60, 70, 80, 100, 125, 150, 200, 300, 500, 1000 centimeters and infinity. In one embodiment, each picture number represents a fixed depth of field difference from an adjacent picture number. For example, in this embodiment, picture number n−1, n, n+1 can be separated by ½, 1, 2, etc. depth of fields. Analogously, each picture number also represents a fixed depth of focus difference.

In FIG. 5A, the hill-climbing algorithm works by recording images at different pictures numbers to compute auto-focus information. The objective of these algorithms is to find the maximum gradient value corresponding to a given location in the scene. The algorithm performs a search until the picture number corresponding to point 502 is found. While this algorithm eventually determines the optimal point 502 on the curve, this algorithm tends to go back and forth around point 502. This results in a large number of pictures for convergence.

Figure 5B:
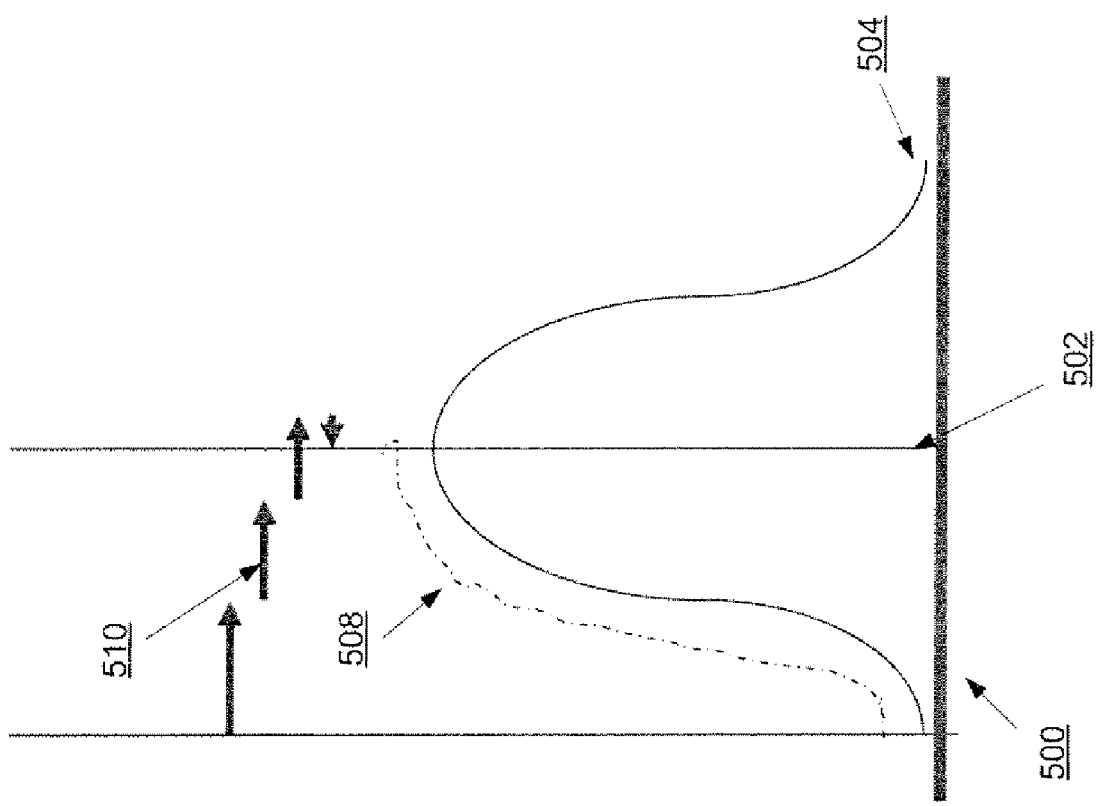
FIG. 5B is a graph illustrating one embodiment of fast auto-focus algorithm.

In contrast, using the blur information resulting from different images captured at different picture numbers can give fast auto-focus convergence. In the event that the blur is spatially varying in the image, we restrict our attention to a particular scene location in the image. FIG. 5B is a graph illustrating one embodiment of fast auto-focus. In FIG. 5B, the fast auto-focus predicts a new picture number on auto-focus curve 504 using blur difference information from other images. In one embodiment, a camera calculates the blur difference between two images. Using the blur difference, the camera moves the current focus position to a new focus position. Two additional pictures are then captured. The process repeats, until the computed change in blur is less than a preset threshold. (In practice, this corresponds to an iteration number that is smaller than a preset threshold. Recall, the iteration number is the number of times the blur kernel is applied to the sharper of the two captured images via convolution, in order to produce an image that has a blur equivalent to the second, more blurred, captured image.) The lens moves to the new and final focus position and the final picture is captured. In the event that the blur is spatially varying in the image, attention is restricted to a specific scene location in the image.

In practice, since it is not known a priori which image contains more blur, the process is applied in both directions. This is described in detail in the patent "REDUCED HARDWARE IMPLEMENTATION FOR A TWO-PICTURE DEPTH MAP ALGORITHM", application Ser. No. 12/111,548.

Figure 6:
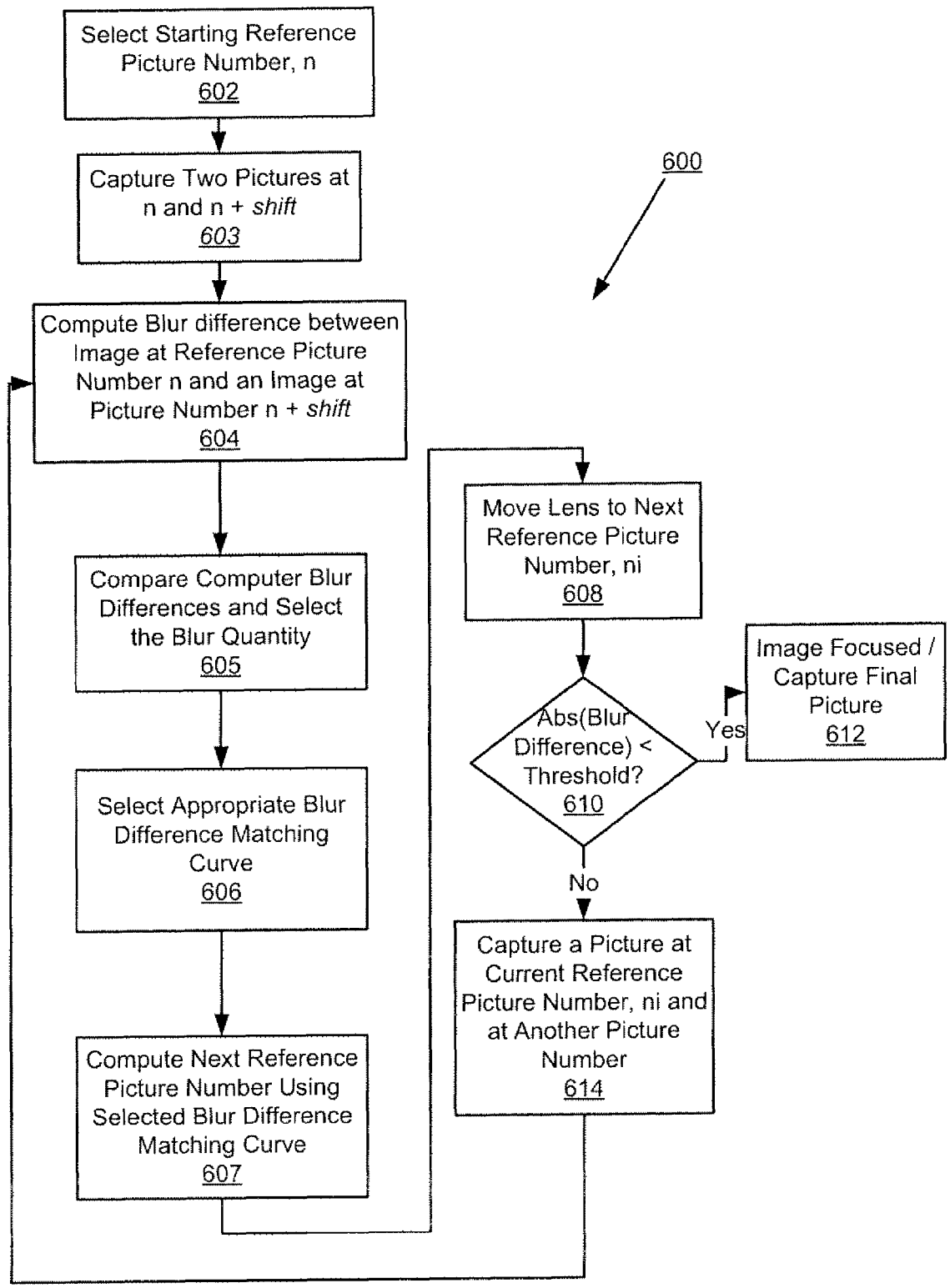
FIG. 6 is a flow diagram of a method for performing fast auto-focus.

FIG. 6 is a flow diagram of a method 600 for performing fast auto-focus. In one embodiment, auto-focus unit 120 executes method 600 to assist in auto-focusing camera lens 102 on the scene. In FIG. 6, at block 602, method 600 determines a starting reference picture. Method 600 can select a reference picture number at infinite focus, a picture number at the lens minimum focus distance, or a picture number somewhere in between.

At block 603, method 600 captures two pictures. If the reference picture number is n, the first picture is captured at n and the second picture is captured at n+shift, where shift is an integer value. As stated previously, picture number n and n+shift can be separated by ½, 1, 2, etc. depth of fields. Analogously, each picture number pair also represents a fixed depth of focus difference.

At block 604, method 600 computes the blur difference between the pictures captured at n (the reference picture number) and n+shift (the second captured picture). In one embodiment, method 600 calculates the blur difference between the two images by convolving one image into another image using a convolving blur kernel. In this embodiment, method 600 applies a blur kernel one or multiple times to determine the blur difference between to the whole or parts of two images. In another embodiment, method 600 applies a blur kernel to part of one image by using a mask. A mask restricts the evaluation and/or processing of an image to part of the image defined by the mask. Masks are further described with reference to FIGS. 20-23 below. In addition, method 600 can compute the blur difference using full or reduced resolution images. Computing a blur difference is further described in the co-pending U.S. patent applications, entitled "METHOD AND APPARATUS FOR GENERATING A DEPTH MAP UTILIZED IN AUTOFOCUSING", application Ser. No. 11/473,694 and "REDUCED HARDWARE IMPLEMENTATION FOR A TWO-PICTURE DEPTH MAP ALGORITHM", application Ser. No. 12/111,548. In one embodiment, method 600 determines the blur difference in the number of iterations needed to convolve one image to another using a 3×3 matrix (blur kernel) that represents one blur unit. In general, the blur kernel can be n×n. Thus, blur differences can be measured in iterations.

At block 605, method 600 compares the computed blur difference values and selects the ideal value. This is described in the patent "REDUCED HARDWARE IMPLEMENTATION FOR A TWO-PICTURE DEPTH MAP ALGORITHM", application Ser. No. 12/111,548.

At block 606, the appropriate blur difference reference curve is selected from a set of blur difference reference curves. In one embodiment, the set of curves will be identical. That is, each curve will be a shifted version of a reference curve. In another embodiment, a set of curves with different characteristics will exist. The appropriate blur difference reference curve is determined by finding the curve whose zero crossing location is closest to the current reference picture number n. The generation of such a set of blur difference reference curves is given in FIGS. 7-17. One embodiment that uses the computed blur difference is further described with reference to FIGS. 19-22 below.

At block 607, method 600 computes the new reference picture number. In order to determine this quantity, the appropriate blur difference reference curve needs to be selected from a set of blur difference reference curves. The computed blur difference quantity is applied to the vertical axis of the selected curve to determine the new picture number located on the horizontal axis.

At block 608, method 600 instructs the camera to move the lens to a new reference picture number ni. The new picture number results from blocks 604 to 607.

At block 610, method 600 determines if the blur difference/iterations number is less than a pre-determined threshold. In one embodiment, method 600 uses the absolute value of the blur difference/iterations quantity. If so, the image is focused and method 600 instructs the camera to capture the final picture at picture number location ni using block 612.

If the blur difference/iterations number is not less than the pre-determined threshold, method 600 instructs the camera to capture two pictures at block 614. The first picture is captured at picture number ni while the second picture is captured at picture number ni+shift. Execution proceeds to block 604 above.

Figure 7:
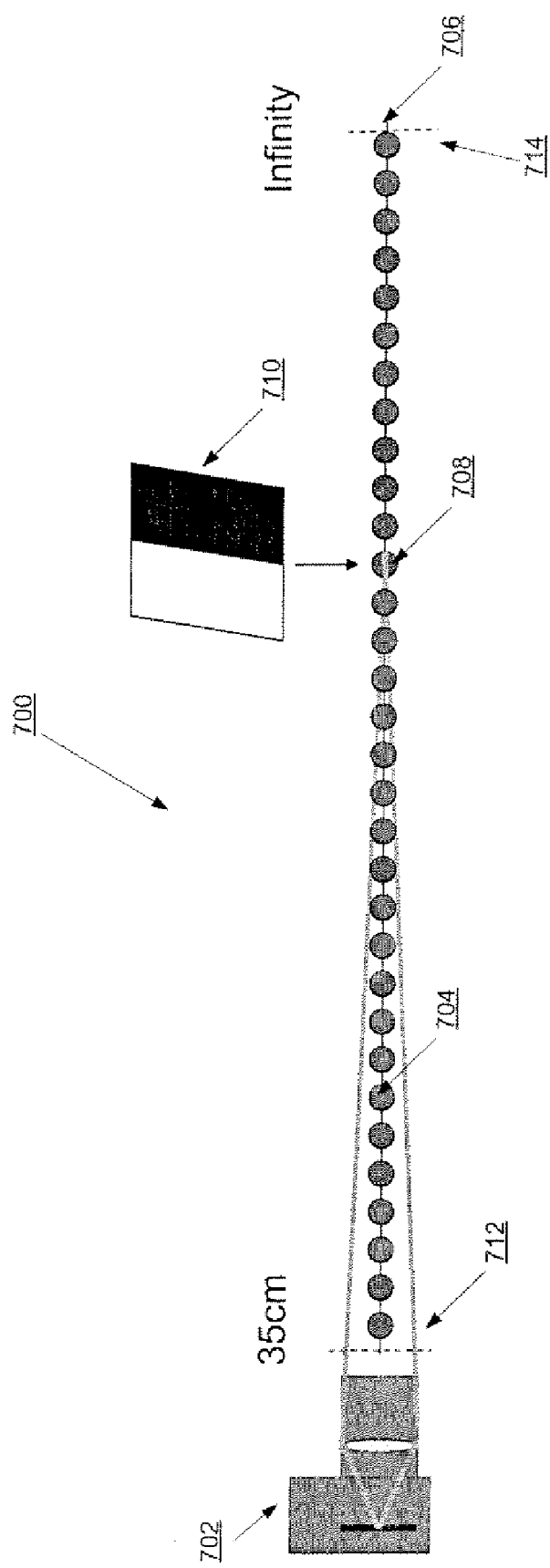
FIG. 7 is a diagram illustrating one embodiment of focusing on a test image for a picture number representing the focused image.
Figure 8:
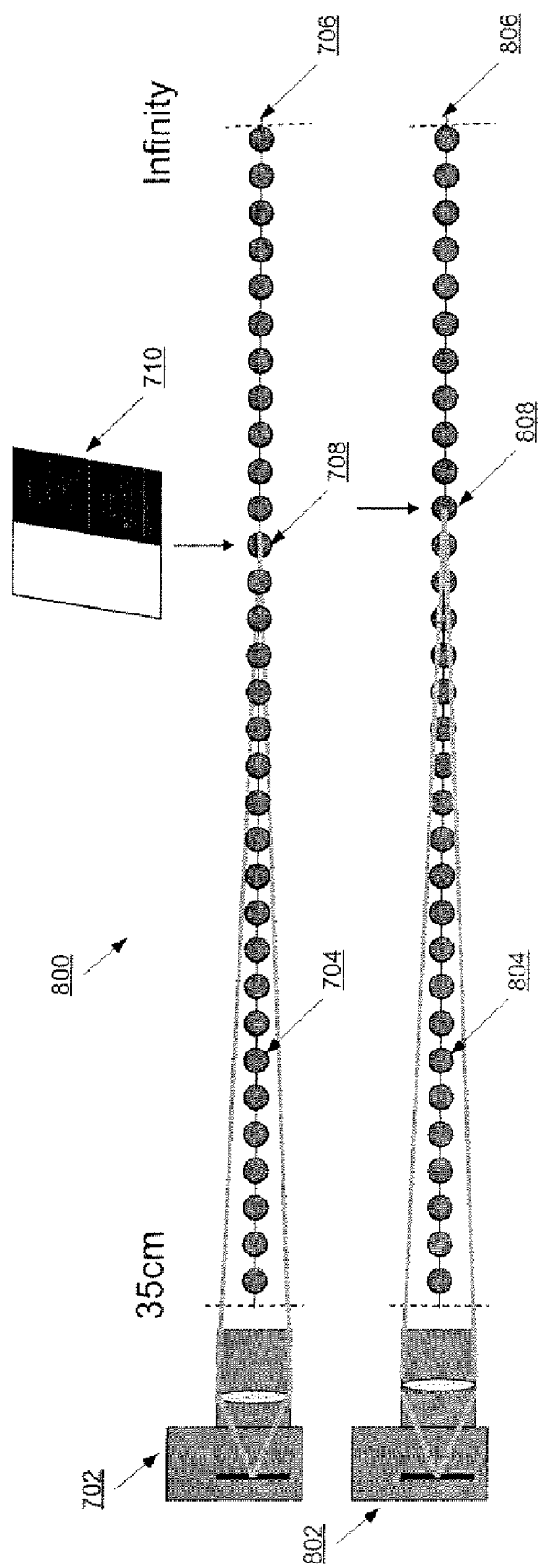
FIG. 8 is a diagram illustrating one embodiment of a blur difference between two pictures of the test image.
Figure 9:
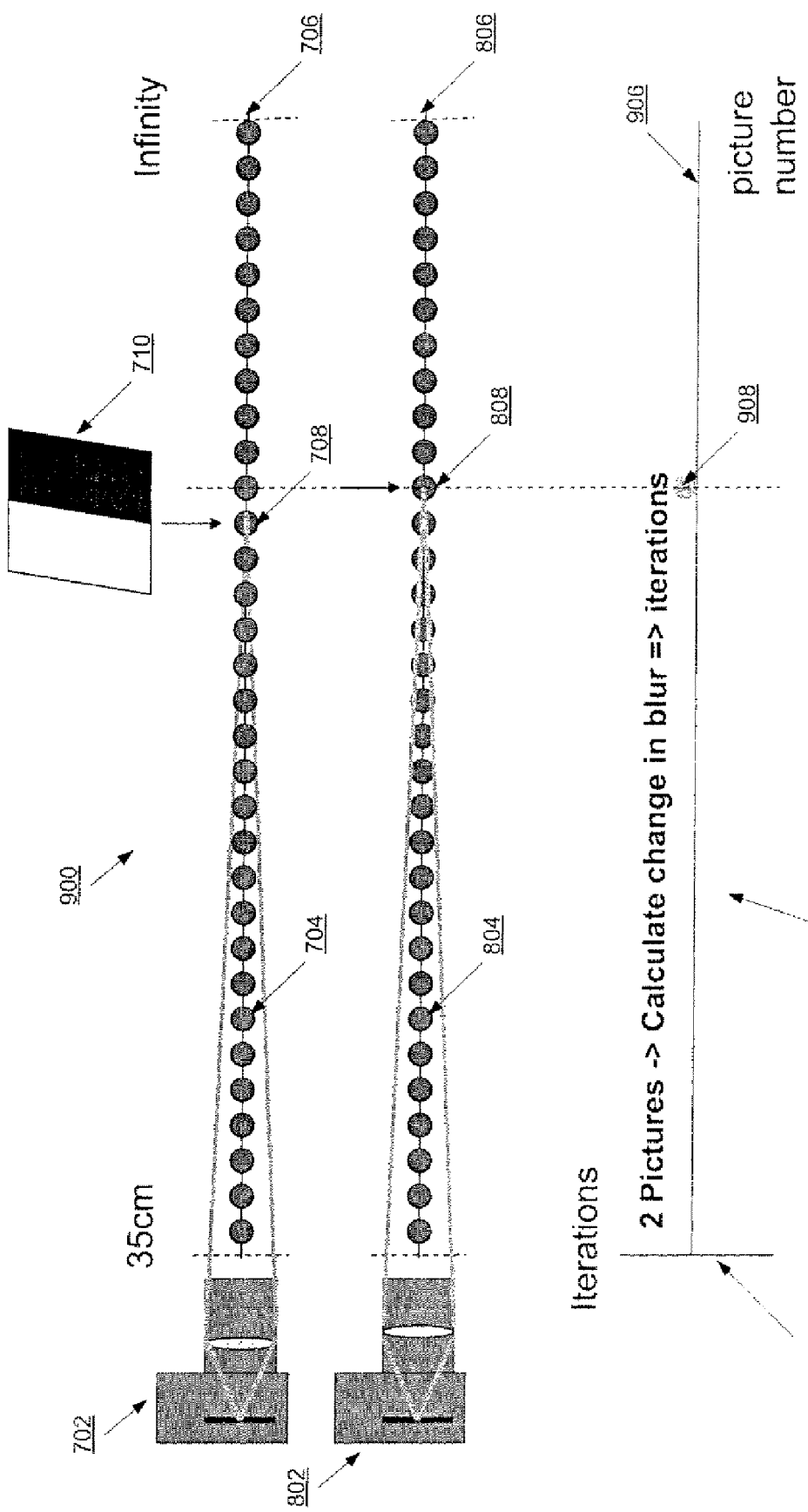
FIG. 9 is a diagram illustrating a calculated blur difference between the two pictures.

As discussed above, method 600 uses the computed blur difference from two captured pictures to predict a new reference picture number. FIGS. 7-15 illustrate one embodiment of the results of method 600 for computing different blur differences at different picture numbers. FIGS. 7-9 are diagrams illustrating the blur difference between two blurred step edge images. FIG. 7 is a diagram illustrating one embodiment of focusing on a test subject 710 for a picture number representing the focused image. In FIG. 7, camera 702 focuses on test subject 710. Camera 702 can focus on test subject 710 at one of the many different picture numbers 704 along a distance 706. In this embodiment, camera 702 can focus on test subject 710 at the minimal picture number 712 at 35 cm (or closer) or at the picture number at infinity 714. The optimally focused image is at picture number 708. The minimal picture number depends on the type of lens 102 camera 100 uses.

FIG. 8 is a diagram 800 illustrating one embodiment of a blur difference between two pictures of the test image. In FIG. 8, camera 802 focuses on test subject 710 at picture number 808. As in FIG. 7, camera 802 can focus on test subject 710 at a different picture numbers 804 along a distance 806. For reference, diagram 700 of camera 702 focusing on test image 710 at picture number 708 is superimposed on FIG. 8.

FIG. 9 is a diagram 900 of one embodiment illustrating a calculated blur difference between two images taken at picture numbers 708 and 808. In FIG. 9, graph 902 illustrates the blur difference between images taken at picture number 708 and picture number at 808. Point 908 on graph 902 represents this blur difference and is plotted on graph 902 as the number of iterations used to convolve the image at picture number 808 to the image at picture number 708. In this embodiment, point 908 is close to zero iterations. Images at picture numbers close to or at the optimal focusing location have smaller blur differences than those for images at adjacent picture numbers for identical shift values. In this embodiment, small blur differences correspond to small iteration numbers because fewer numbers of blur iterations is needed to convolve one image into another. Thus, the amount of blur can be measured in the number of iterations used to convolve one image into another. In contrast, images far from the optimal focusing can have large blur differences with large numbers of iterations.

Figure 10:
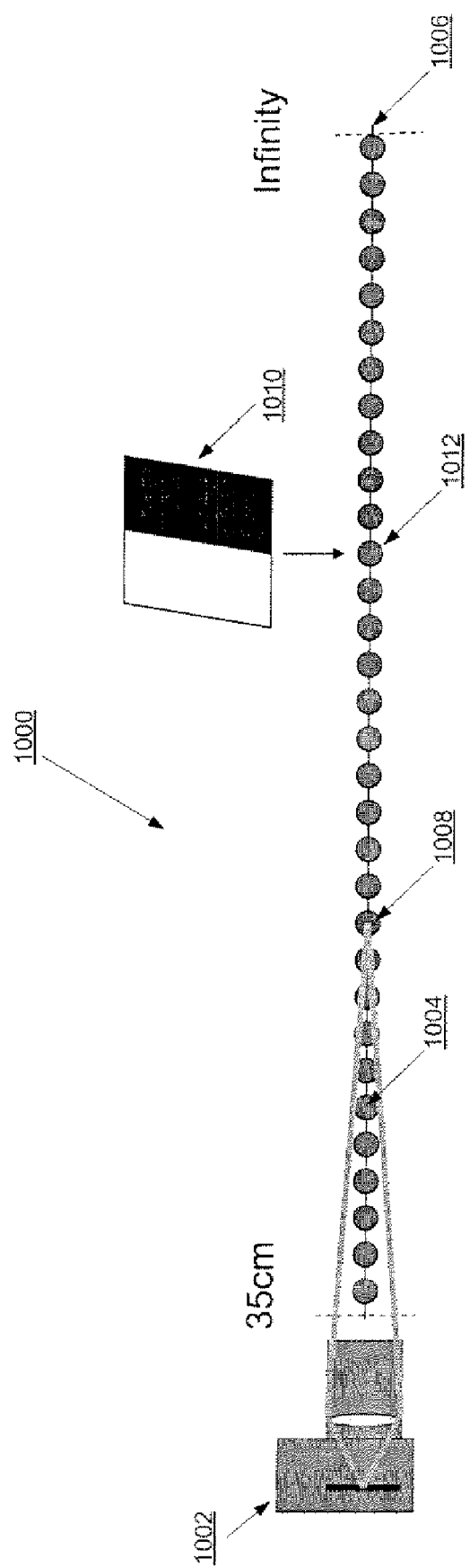
FIG. 10 is a diagram illustrating one embodiment of focusing on a test image for a picture number that is out of focus.
Figure 11:
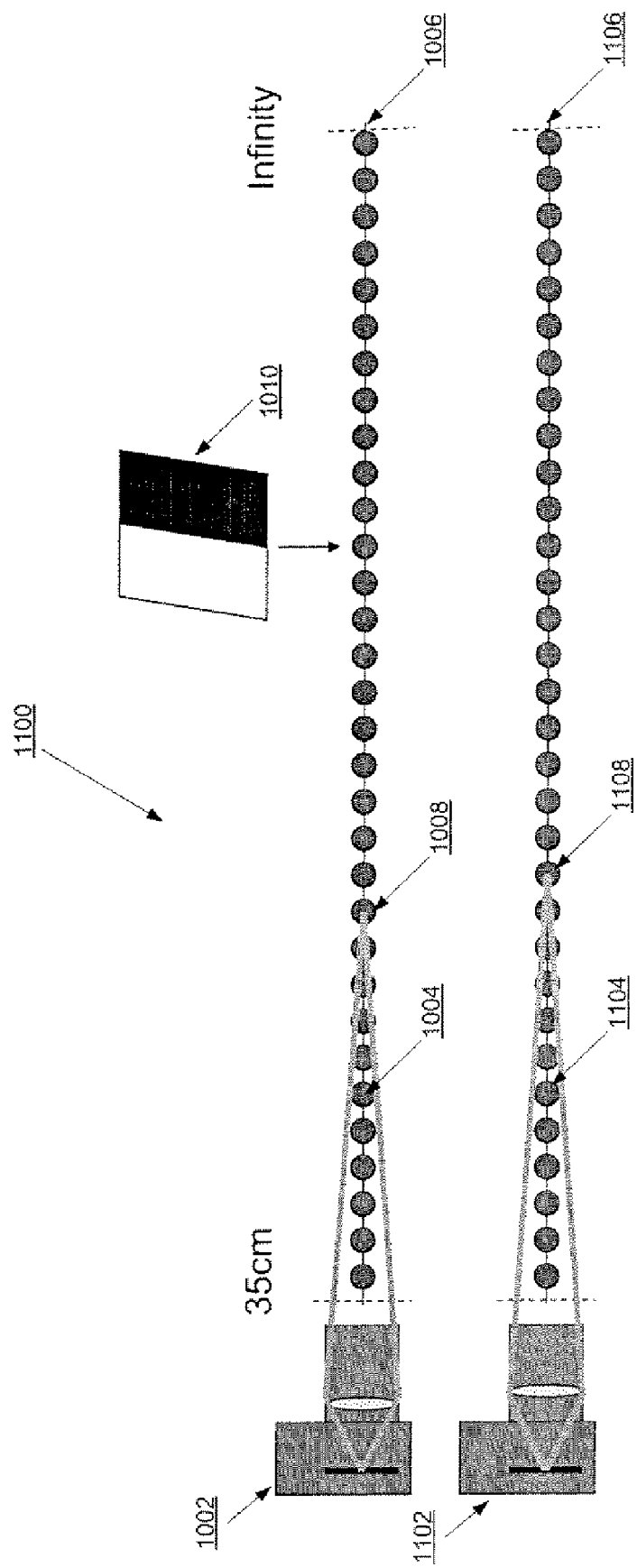
FIG. 11 is a diagram illustrating one embodiment of a blur difference between two pictures of the test image.
Figure 12:
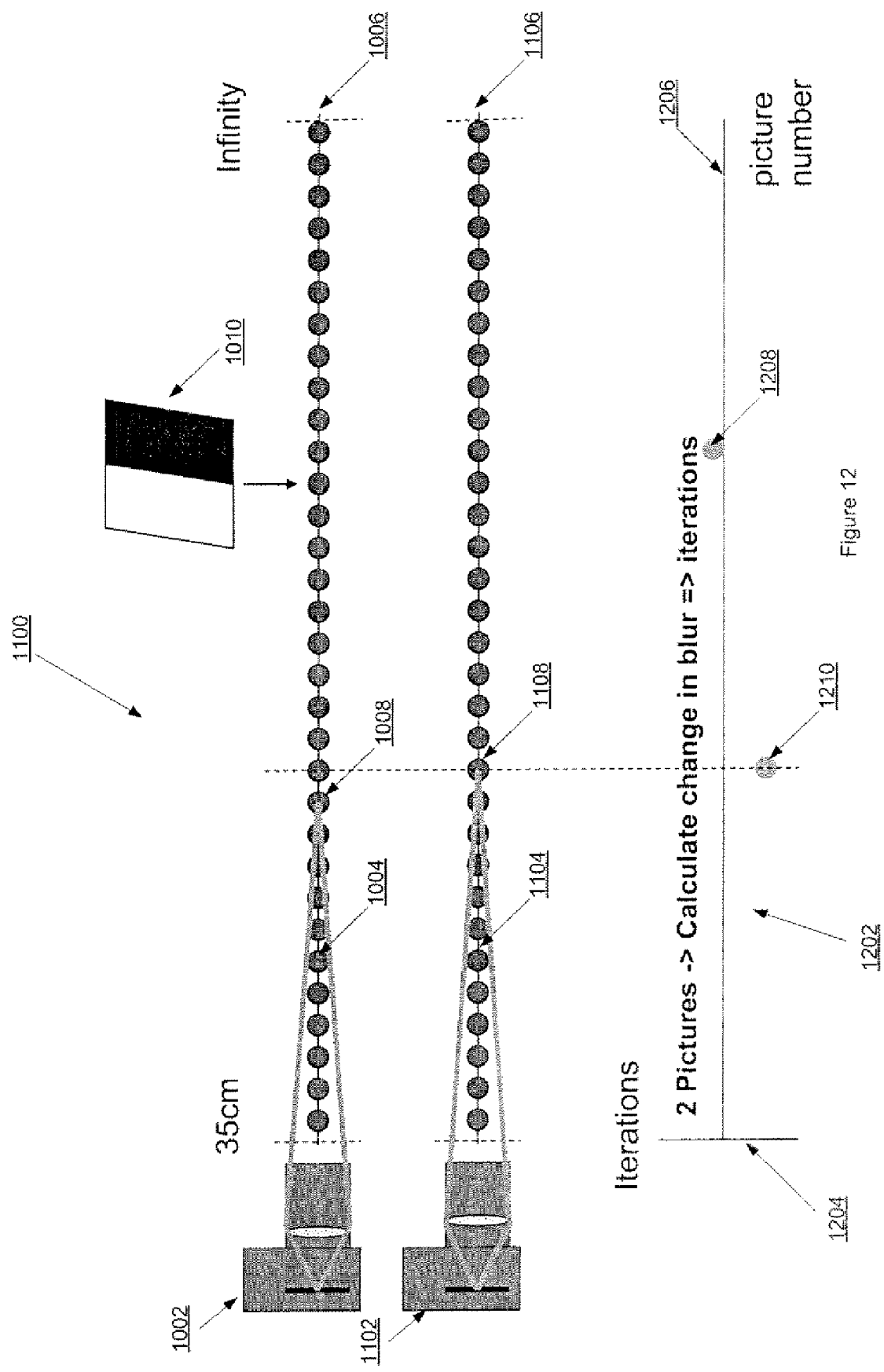
FIG. 12 is a diagram illustrating a calculated blur difference between the two pictures as compared to the calculated blur difference in FIG. 9.

FIGS. 10-12 are diagrams illustrating the blur difference between two blurred step edge images and comparing this blur difference with the one calculated in FIG. 9. FIG. 10 is a diagram 1000 illustrating one embodiment of the focusing on test subject 1010 for a picture number that is out of focus. In FIG. 10, camera 1002 focuses on test subject 1010 at picture number 1008. In this embodiment, picture number 1008 is closer to camera 1002 than the optimally focused picture at picture number 1012. The image at picture number 1008 is out of focus and blurred as compared with the image at picture number 708 in FIG. 7.

FIG. 11 is a diagram illustrating one embodiment of a blur difference between two pictures of the test subject 1010. In FIG. 11, camera 1102 focuses on test subject 1010 at picture number 1108. As in FIG. 10, camera 1102 can focus on test subject 1010 at different picture numbers 1104 along a distance 1106. For reference, diagram 1000 of camera 1002 focusing on test image 1010 at picture number 1008 is superimposed on FIG. 11.

FIG. 12 is a diagram illustrating a calculated blur difference between the two pictures as compared to the calculated blur difference in FIG. 9. In FIG. 12, graph 1202 illustrates the blur difference between images taken at picture numbers 1008 and 1108. Point 1210 on graph 1202 represents this blur difference and is plotted on graph 1202 as the number of iterations to convolve image at picture number 1108 to the image at picture number 1008. In addition, the blur difference calculated in FIG. 9 is at point 1208. Point 1210 represents a larger number of iterations as compared with point 1208. Point 1210 is negative because the picture captured at picture number 1008 is more blurred than the picture captured at picture number 1108. For reference, the diagrams of FIGS. 10 and 11 are superimposed on FIG. 12.

Figure 13:
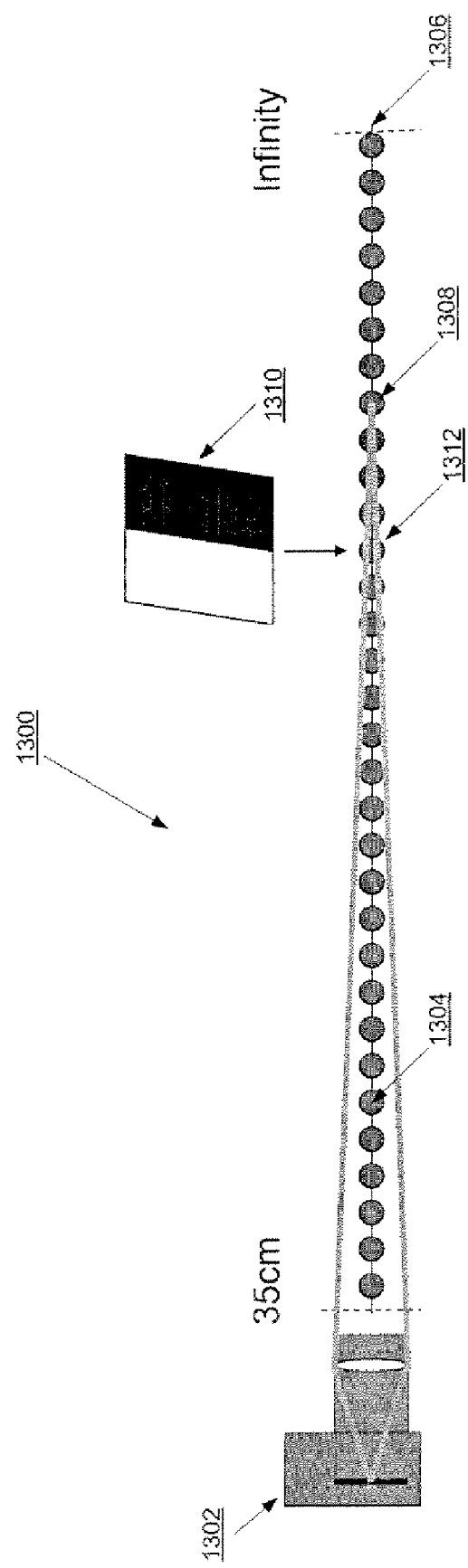
FIG. 13 is a diagram illustrating one embodiment of focusing on a test image for a picture number that is out of focus.
Figure 14:
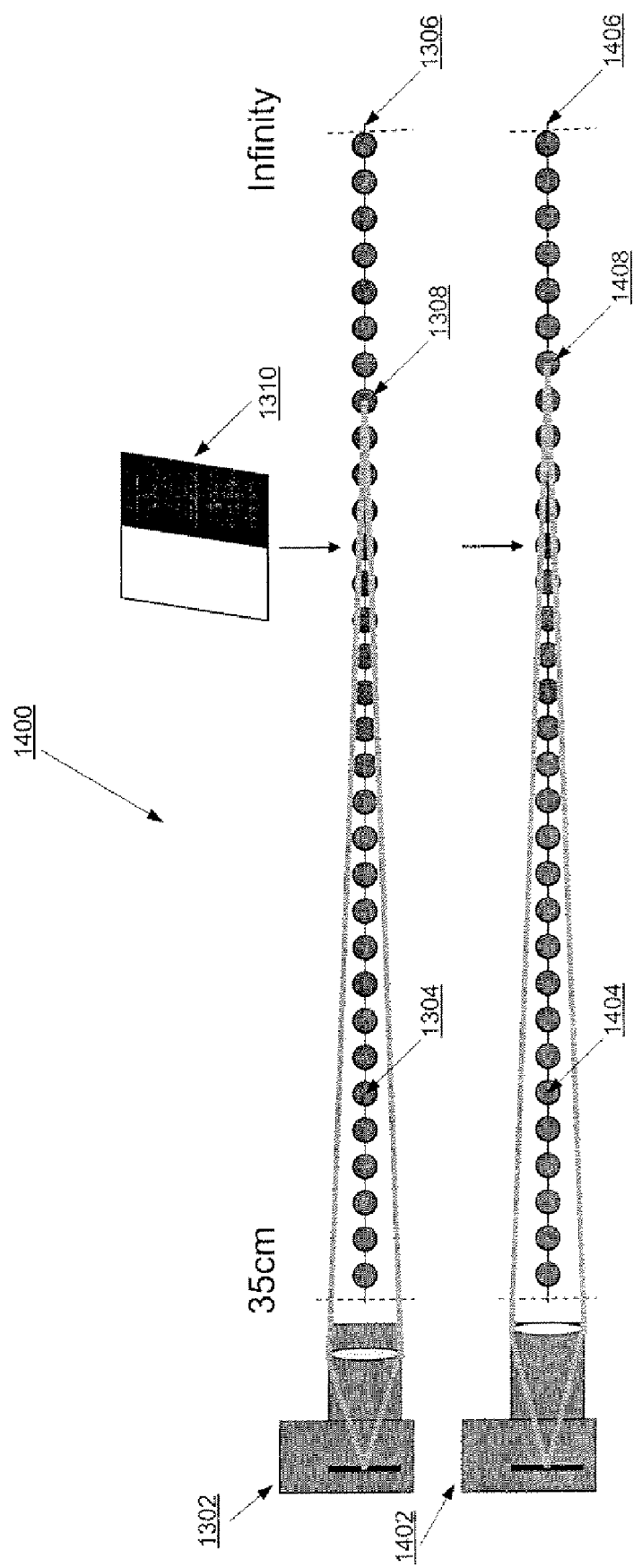
FIG. 14 is a diagram illustrating one embodiment of a blur difference between two pictures of the test image.
Figure 15:
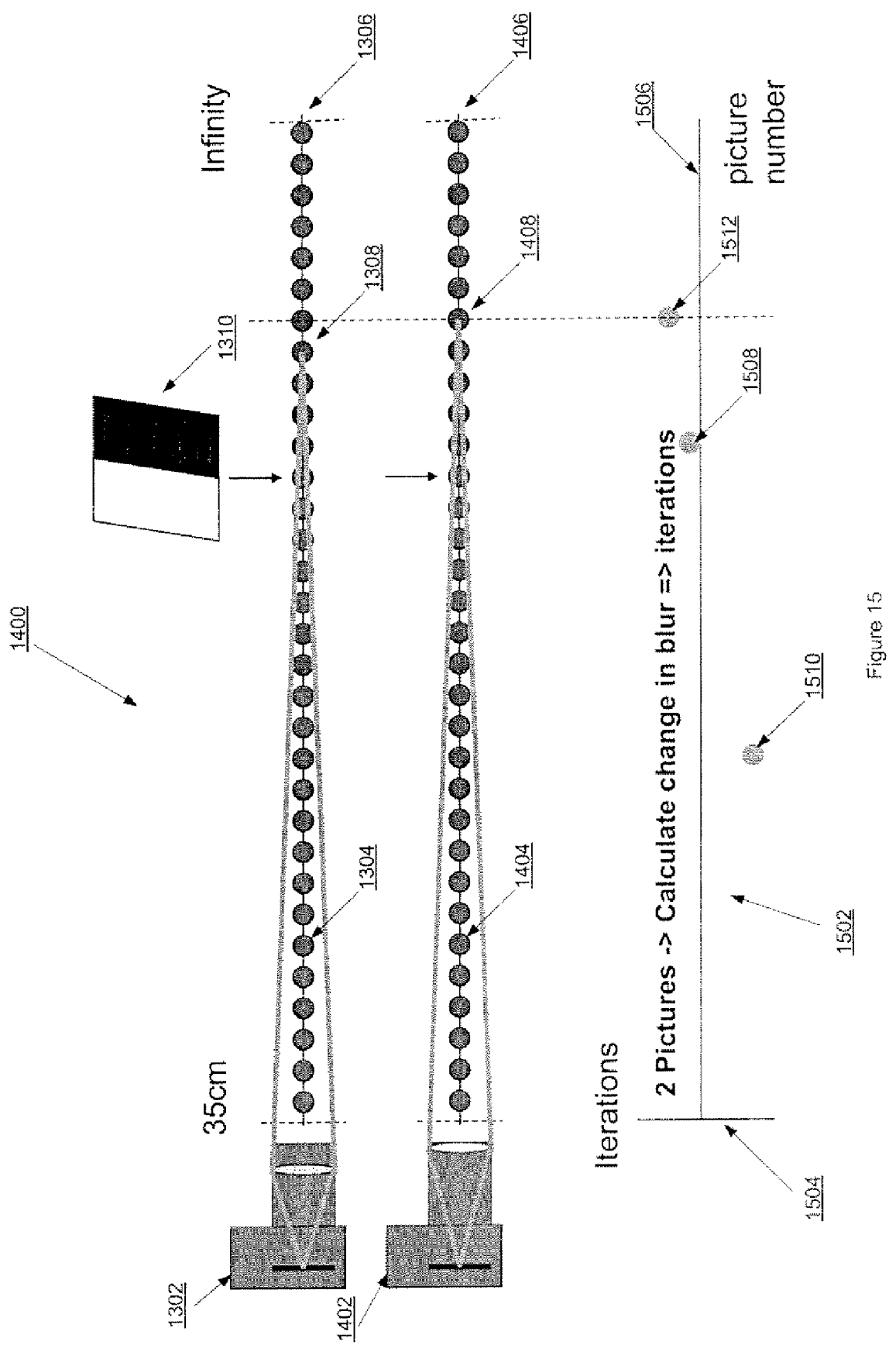
FIG. 15 is a diagram illustrating a calculated blur difference between the two pictures as compared to the calculated blur difference in FIGS. 9 and 12.

FIGS. 13-15 are diagrams illustrating the blur difference between two blurred step edge images and comparing this blur difference with the one calculated in FIGS. 9 and 12. FIG. 13 is a diagram 1300 illustrating one embodiment of the focusing on test subject 1310 for a picture number that is out of focus. In FIG. 13, camera 1302 focuses on test subject 1310 at picture number 1308. In this embodiment, picture number 1308 is further from camera 1302 than the optimally focused picture at picture number 1312. The image at picture number 1308 is out of focus and blurred as compared with the image at picture number 708 in FIG. 7.

FIG. 14 is a diagram illustrating one embodiment of a blur difference between two pictures of the test subject 1310. In FIG. 14, camera 1402 focuses on test subject 1310 at picture number 1408. As in FIG. 10, camera 1402 can focus on test subject 1310 at different picture numbers 1404 along a distance 1406. For reference, diagram 1300 of camera 1302 focusing on test subject 1310 at picture number 1308 is superimposed on FIG. 14.

FIG. 15 is a diagram illustrating a calculated blur difference between the two pictures as compared to the calculated blur difference in FIGS. 9 and 12. In FIG. 15, graph 1502 illustrates the blur difference between images taken at picture numbers 708 and 808, 1008 and 1108 and 1308 and 1408. Point 1512 on graph 1502 represents the latter blur difference and is plotted on graph 1502 as the number of iterations to convolve image at picture number 1308 to the image, at picture number 1408. In addition, the blur difference calculated in FIGS. 9 and 12 are at points 1508 and 1510, respectively. Point 1512 represents a larger number of iterations as compared with point 1508. In contrast with point 1510, point 1512 is positive because the picture captured at picture number 1308 is less blurred than the picture captured at picture number 1408. For reference, the block diagrams of FIGS. 13 and 14 are superimposed on FIG. 15.

Figure 16:
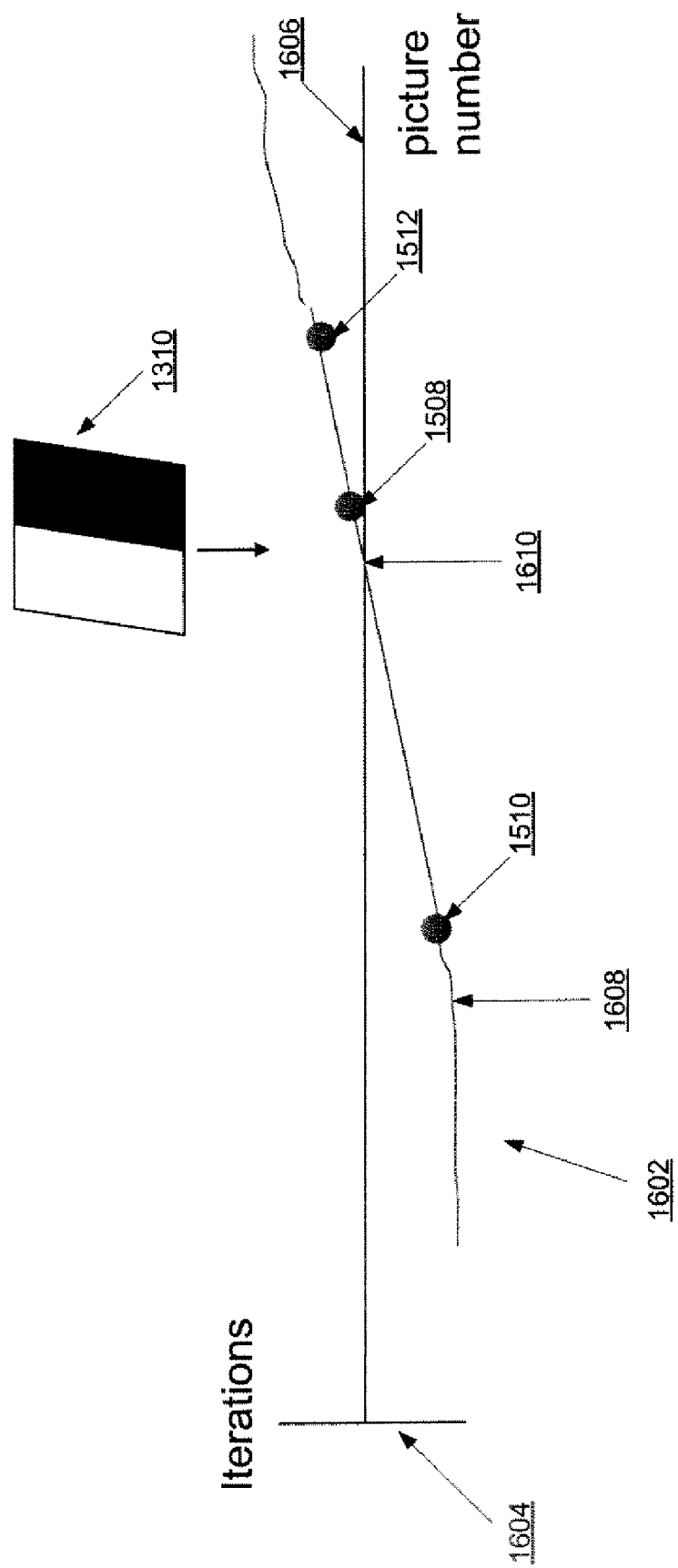
FIG. 16 is a graph illustrating a plot of the blur differences versus reference picture number.

FIG. 16 is a graph 1602 illustrating a plot of the blur iterations versus reference picture number. In FIG. 16, points 1508, 1510 and 1512 represent the calculated blur differences in FIGS. 9, 12, and 15 along iterations axis 1604 and picture number axis 1606. Curve 1608 can be drawn through points 1508, 1510, and 1512. As illustrated in FIG. 16, curve 1608 is nearly linear in between points 1508, 1510, and 1512. Furthermore, curve 1608 transitions from negative to positive at point 1610. Zero iteration denotes the focused point for test subject 1310. In one embodiment, a zero iterations value can result if the two captured pictures have the same amount of blur. In another embodiment, the iteration number will change from negative to positive for each successive two picture capture. The picture number associated with this negative to positive transition closely approximates the focused point. Thus, blur difference can be used to predict where an image is focused by developing curve 1608 for an image and predicting which picture number has zero iterations on curve 1608, or, in the typical case, which picture number is associated with the negative to positive transition in iterations value. In one embodiment, the use of this curve for prediction can be employed in method 600 in FIG. 6 by auto-focus unit 120 above.

In one embodiment, a blur difference curve, such as curve 1608 in FIG. 16, can be used to determine the optimally focused picture number for a given three dimensional scene and camera optical settings. In another embodiment, the blur difference can be modeled using polynomial, interpolation, or other algorithms known in the art to approximate a curve. Furthermore, in these embodiments, a curve can be constructed from computed blur differences to predict an optimal focus distance.

In alternate embodiments, multiple curves can be used to determine the optimally focused picture number. In one of these embodiments, this is used when the slope of the curve is not the same for test subjects 1706 and 1756. FIGS. 17A-B are graphs illustrating shifting plots of blur iterations versus reference picture number. In FIG. 17, curves 1702 and 1752 are blur difference curves for test subject 1706 and 1756 at different picture numbers. In FIG. 17A, curve 1702 transitions from negative to positive at point 1704 while curve 1752 transitions from negative to positive at point 1754. As illustrated in FIGS. 17A-B, different blur difference curves can result when test subject 1706/1756 changes. Thus, an auto-focus algorithm uses different blur difference reference curves for focusing and to determine a focus distance.

Figure 18:
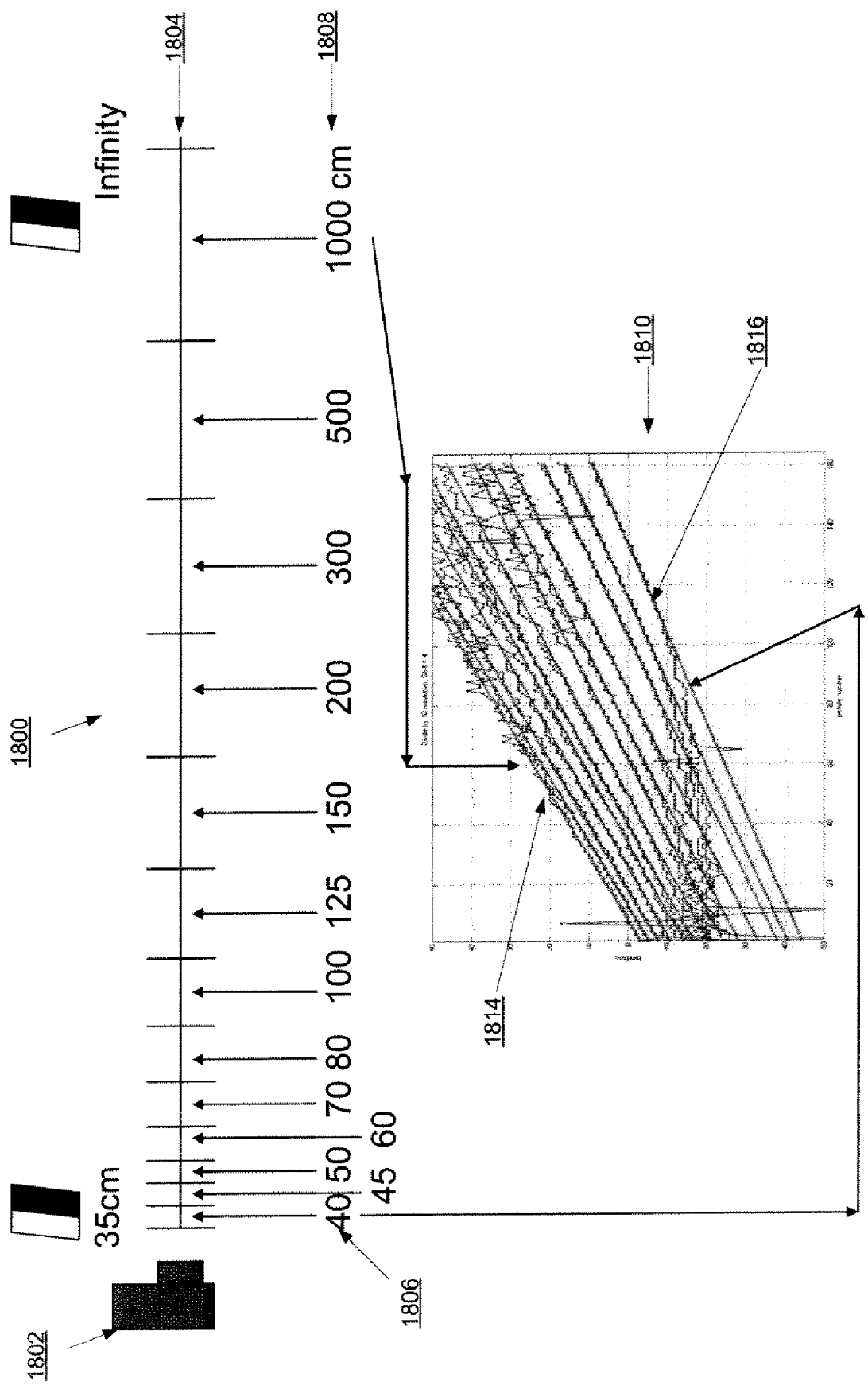
FIG. 18 is a diagram illustrating one embodiment of a set of blur difference reference curves.

FIG. 18 is a block diagram illustrating one embodiment of a set of empirical blur difference reference curves. In FIG. 18, camera 1802 stores several blur difference curves 1810. There can be blur difference reference curves for each particular camera optical setting, such a combination of lens type, aperture, focal distance, focus positions, etc. Alternatively, there can be a set of blur difference reference curves for many or all possible optical settings.

In the embodiment illustrated in FIG. 18, there is a different reference curve at different picture numbers for camera 1802. As described above, each picture number represents a different focus distance. Each curve is plotted as the number of iterations versus reference picture number. Note that each curve goes from negative iterations to positive number of iterations. Thus, each curve has a picture number where there are zero iterations. This point defines the focused image for that focus distance. For example, blur difference reference curve 1816 represents that blur difference curve for a focus distance 1806 of 40 cm. As another example, blur difference reference curve 1814 represents a focus distance 1808 of 1000 cm.

In one embodiment, for a given camera, the different reference curves are generated using a number of test targets. Each camera can have different number of reference curves for different camera configurations (e.g., the camera's lens configuration, and other parameters (focal length, aperture, etc)). For example, one camera at maximum focal length would have four reference curves. At minimum focal length, this camera would have eleven reference curves. Different cameras could have different numbers of reference curves.

FIG. 19 A-D are graphs representing different blur difference curves used to predict reference picture numbers as described in FIG. 6, at block 606. FIG. 19A is a graph one embodiment of illustrating the predicting of a next reference picture number using a pair of images. In FIG. 19A, camera 1902 acquires two images 1916A-B at and near distance 1908 (previously defined as n and n+shift) of subject 1904 measured on distance 1906. Because distance 1908 is too close to the camera 1902 as compared with subject 1904, images 1916A-B are blurry. Based on distance 1908, camera 1902 uses the blur difference reference curve 1912 to predict the next picture number for the auto-focus search. The computed blur difference between images 1916A-B corresponds to the iterations number shown at point 1914. As a result, the lens focus position is moved from distance 1908 to distance 1932, FIG. 19B.

Figure 19A:
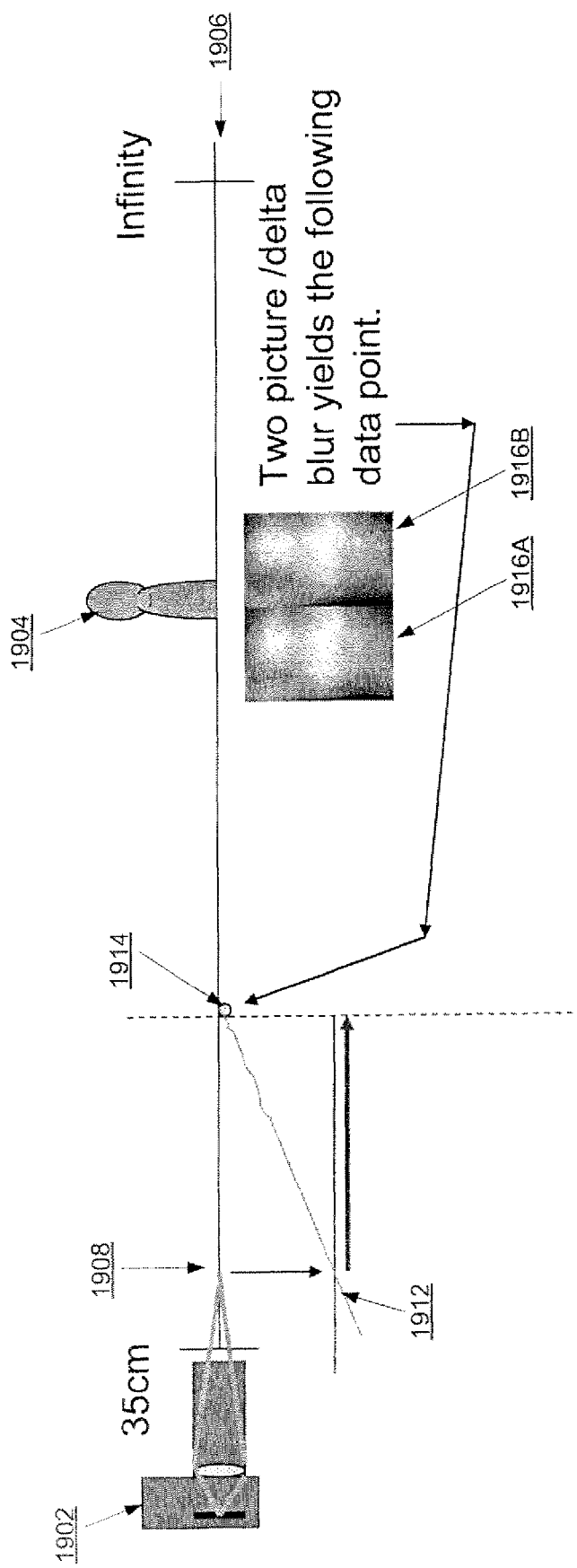
FIG. 19A-D are graphs of one embodiment of method 600 illustrated in FIG. 6.
Figure 19B:
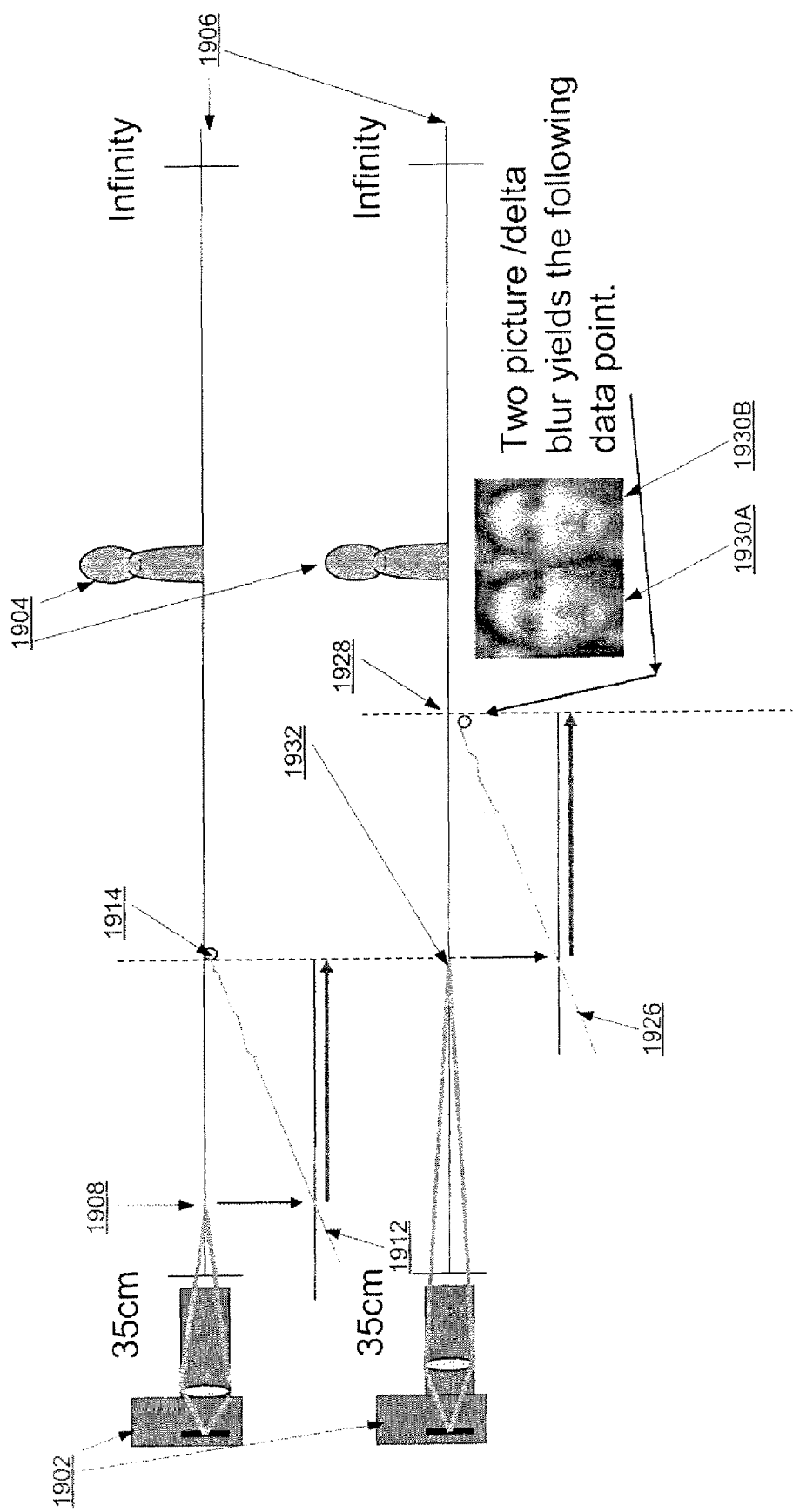

FIG. 19B is a graph illustrating one embodiment of the selection of the next reference picture number based on two images acquired at and near distance 1932. In FIG. 19B, camera 1902 acquires images 1930A-B at and near distance 1932 (previously defined as n1 and n1+shift, i=1). Images 1930A-B are still blurry, but less blurry than images 1916A-B. Based on picture number n1 and n1+shift at and near distance 1932, camera 1902 selects blur difference curve 1926 to predict the next picture number. The computed blur difference between images 1930A-B correspond to the iterations number shown at point 1928. As a result, the lens focus position is moved from distance 1932 to distance 1944, in FIG. 19C. For reference, the graph from FIG. 19A is superimposed on FIG. 19B.

Figure 19C:
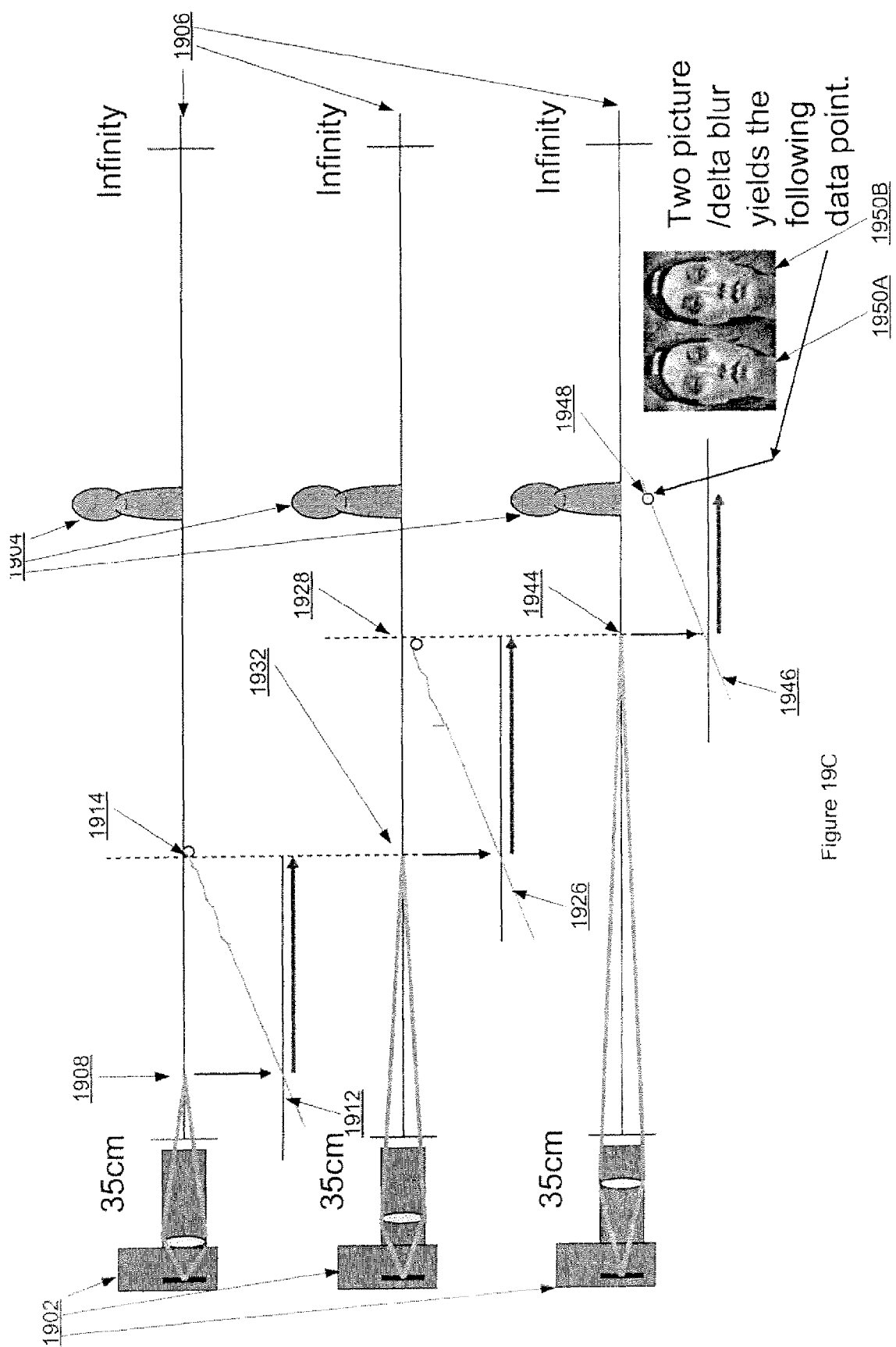

FIG. 19C is a graph illustrating one embodiment of the selection of the next reference picture number based on two images acquired at and near distance 1944. In FIG. 19C, camera 1902 acquires images 1950A-B at and near distance 1944 (defined as n2 and n2+shift). Images 1950A-B are less blurry that images 1930A-B, but have not converged on an in-focus picture. Camera 1902 selects a new picture number based on curve 1946. The computed blur difference between images 1950A-B correspond to the iterations number shown at point 1948. Since the iterations number is smaller than a pre-defined threshold, the lens focus position is moved from distance 1944 to the final distance 1964, in FIG. 19D. For reference, the graphs from FIG. 19A-B are superimposed on FIG. 19C.

Figure 19D:
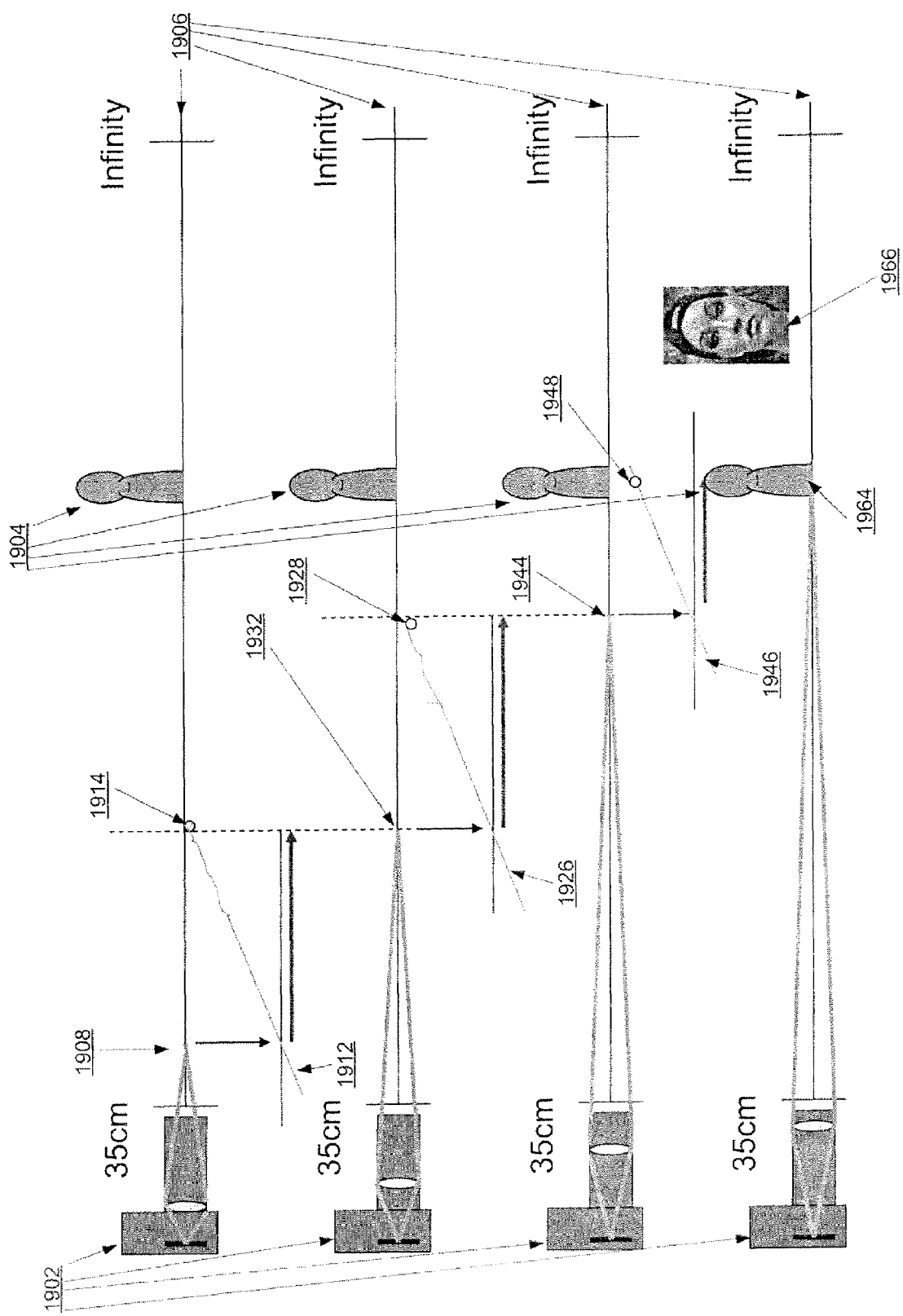

FIG. 19D is a graph illustrating the convergence of the auto-focus search. In FIG. 19D, camera 1902 acquires image 1966 at distance 1964. In this embodiment, image 1966 represents the in-focus image of test subject 1904 that was achieved by acquiring three pairs of image using method 600. For reference, graphs from FIG. 19A-C are superimposed on FIG. 19D.

Figure 20:
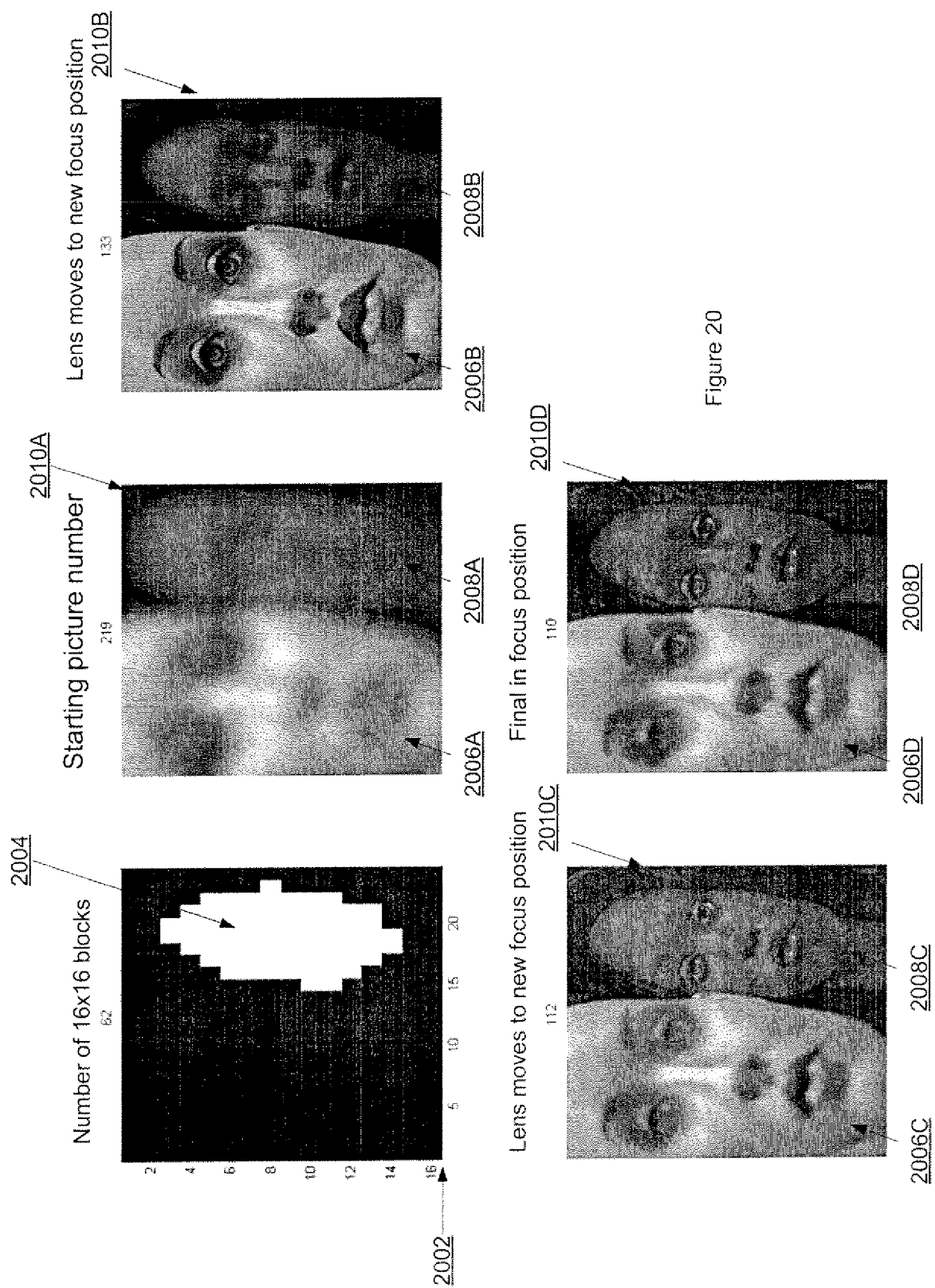
FIGS. 20-22 is one embodiment of a set of images illustrating the convergence of the fast auto-focus at the mask location shown.
Figure 21:
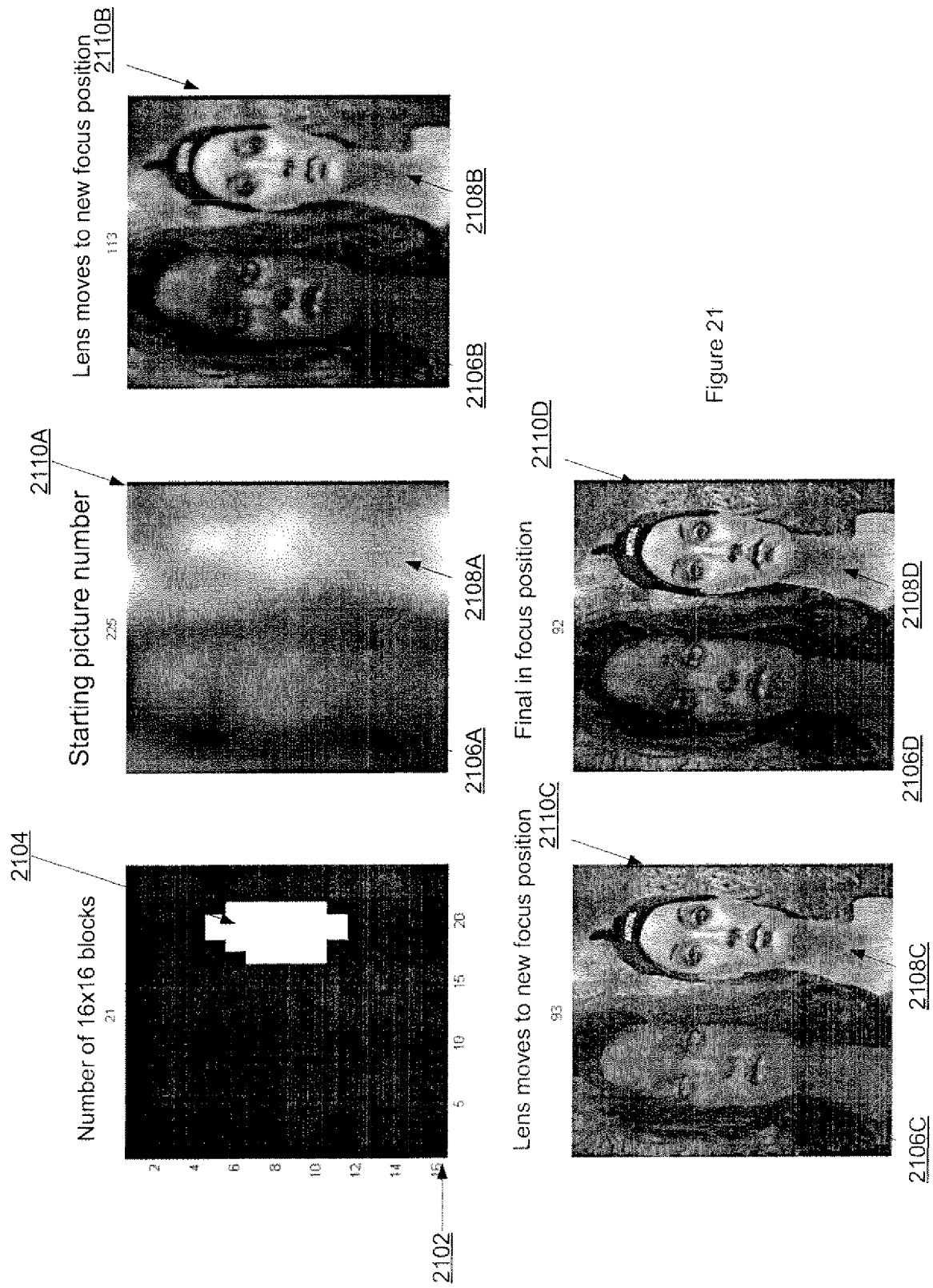
Figure 22:
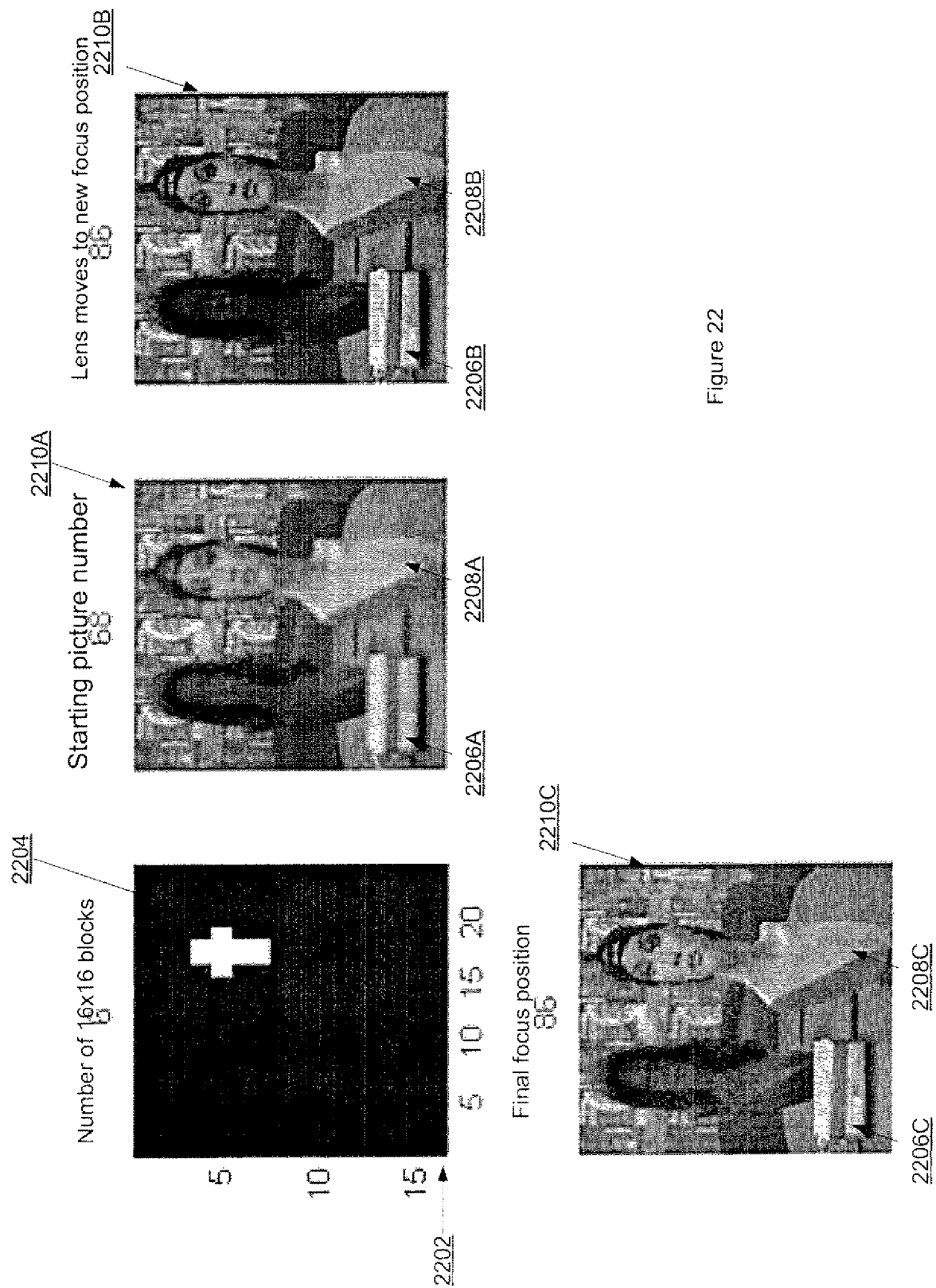

FIGS. 20-22 illustrates different examples of a camera using fast auto-focus to converge on a test subject with different image masks. FIGS. 20-22 are described in reference to camera 100 in FIG. 1 above. FIG. 20 is one embodiment of a set of images illustrating the convergence of the fast auto-focus search using mask 2002. In FIG. 20, mask 2002 is used to converge on a focused image. Mask 2002 restricts the evaluation area to a subset of the image, such as to one of the faces of the models in the image. In this embodiment, mask 2004 restricts comparison of blur differences to image area 2004 of mask 2002. The masks delineate areas in the image containing space invariant blur. For the examples shown, the facial areas are identified and acquired using face detection technology known in the art. In general a mask of any size and shape can be applied to an arbitrary location in an image suspected of containing space invariant blur.

Images 2010A-D illustrate one embodiment of a set of images acquired while converging on rear model 2008A-D using mask 2002. Mask 2002 blocks off analysis of front model 2006A-D) when determining blur difference using method 600. Image 2010A is at the starting picture number, picture number 209, and illustrates a blurred back model 2008A with a less blurred front model 2006A. Camera 100 focuses lens 102 to picture number 133 and acquires image 2010B. Image 2010B has a more in-focus front model 2006B and less in-focus back model 2008B. Camera 100 focuses lens 102 to a new focus position at picture number 112 and acquires image 2010C. Image 2010C has front model 2006C blurrier than back model 2008C. Back model 2008C is close to being in-focus. Camera 100 focuses lens 102 to in-focus position at picture number 110 and acquires image 2010D. Image 2010D represents an in-focus image for back model 2008D. Front model 2006D is out of focus.

FIG. 21 is one embodiment of a set of images illustrating the convergence of the fast auto-focus search using mask 2102. In FIG. 21, mask 2102 is used to converge on a focused image. In this embodiment, mask 2102 restricts comparison of blur differences to image area 2104 of mask 2102.

Images 2110A-D illustrate one embodiment of a set of images acquired while converging on rear model 2108A-D using mask 2102. As in FIG. 21, Mask 2102 blocks off analysis of front model 2106A-D when determining blur difference using for camera 100 using method 600. Camera 100 acquires image 2110A at the starting picture number 225 and illustrates a more blurred hack model 2108A with less blurred front model 2106A. Camera 100 focuses tens 102 at picture number 113 and acquires image 2110B. Image 2110B has a less blurred front model 2106B and a more blurred back model 2108B. Camera 100 focuses lens 102 at picture number 93 and acquires image 2110C. Image 2110C has front model 2106C less blurred than hack model 2108C. Back model 2108 is close to being in focus. Camera 100 focuses lens 102 to in-focus position at picture number 92 and acquires image 2110D. Image 2110D represents an in-focus image for back model 2108D. Front model 2106D is out of focus.

FIG. 22 is one embodiment of a set of images illustrating the convergence of the fast auto-focus search using mask 2202. In FIG. 22, mask 2202 is used to converge on a focused image. In this embodiment, mask 2202 restricts comparison of blur differences to image area 2204 of mask 2202.

Images 2210A-C illustrate one embodiment of a set of images acquired while converging on front model 2208A-C using mask 2202. Mask 2202 blocks off analysis of rear model 2206A-C when determining blur difference using for a camera using method 600. Camera 100 acquires image 2210A at the starting picture number 68. Image 2210A illustrates a blurred front model 2208A with a less blurred back model 2206A. Camera 100 focuses lens 102 at picture number 86 and acquires image 2210B. Image 2210B has an in focus front model 2206B and less in-focus back model 2208B. Image 2210C represents an in-focus image for front model 2206C. Back model 2206C is out of focus.

Figure 23:
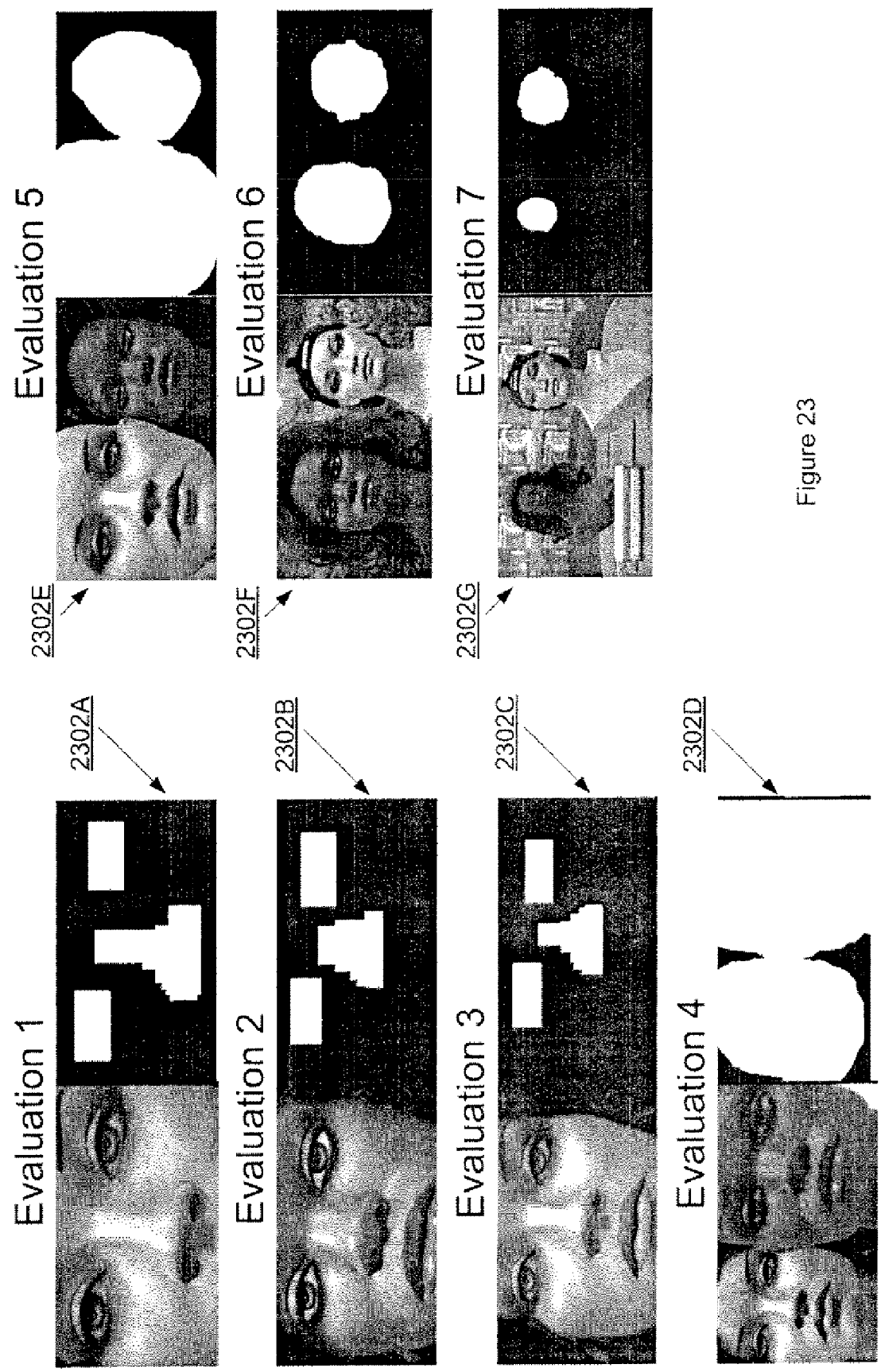
FIG. 23 illustrates a set of masks used to converge the fast auto focus results as illustrated in FIGS. 24-30.

FIG. 23 is a set of masks used in conjunction with fast auto-focus results in FIGS. 24-30. In FIG. 23, image masks 2302A-G are used to restrict the evaluation and processing area of an image to the white area of the mask. In this Figure, camera 100 uses image masks 2302A-G to evaluate and/or process different parts of an image. For example, mask 2302A restricts the processing to the eyes and nose of the white model. Mask 23021B restricts the processing to the eyes and nose of the black model. Mask 2302C restricts the processing to the eyes and nose of the white model as in mask 2302A. The distance of the white model corresponding to mask 2302A is closer than the distance of the white model corresponding to mask 2302C. Mask 2302D restricts the processing to the faces of the front and back models, where the area for the front model is greater than the area of the back model. Mask 2302E is similar to the mask 2302D by restricting the processing area to the faces of the front and back models, with the area for the front model is greater than the area of the back model. Mask 2302F has a mask area that includes both the front and back models, where the area for the front model is greater than the area of the back model. Both encompass a smaller area than those in 2302E. Mask 2302G has a mask area that includes both the front and back models, with roughly equal sizes for each model and encompassing a smaller area than mask 2302E or 2302F.

FIGS. 24-30 are graphs illustrating fast auto-focus convergence results for the different image masks of FIG. 23. In FIG. 24, three sets of graphs illustrate the fast auto-focus using mask 2302A. The graphs are in-focus graphs 2402A-B that illustrate the focused pictured number based on the starting picture number, final shift graph 2404A-B that illustrate the shift that occurs right before the lens is moved to the in focus position, and number of two pictures graphs 2406A-B that illustrates the number of two picture pairs used to converge on the focused picture.

In FIG. 24, graphs 2402A, 2404A, and 2406A result from camera 100 focusing on the foreground nose of mask 2302A.

Graph 2402A illustrates that the focused picture number varies with the starting point of the fast auto-focus. For example, the focused picture number varies from 149 to 158 depending on the starting picture number. Graph 2404A reflects the shift that occurs right before the lens is moved to the in focus position. It is interesting to note that the fast auto-focus converges using 1-5 two picture pairs as illustrated in graph 2406A.

In comparison, graphs 2402B, 2404B, and 2406B result from camera 100 focusing on the background eyes of mask 2302A. Graph 2402B illustrates that the focused picture number varies with the starting point of the fast auto-focus, but the variance is less than in graph 2402A. For example, the focused picture number varies from 146 to 149 depending on the starting picture number. Graph 2404B the shift that occurs right before the lens is moved to the in focus position. It is interesting to note that the fast auto-focus converges using 1-3 two picture pairs as illustrated in graph 2406B.

Figure 25:
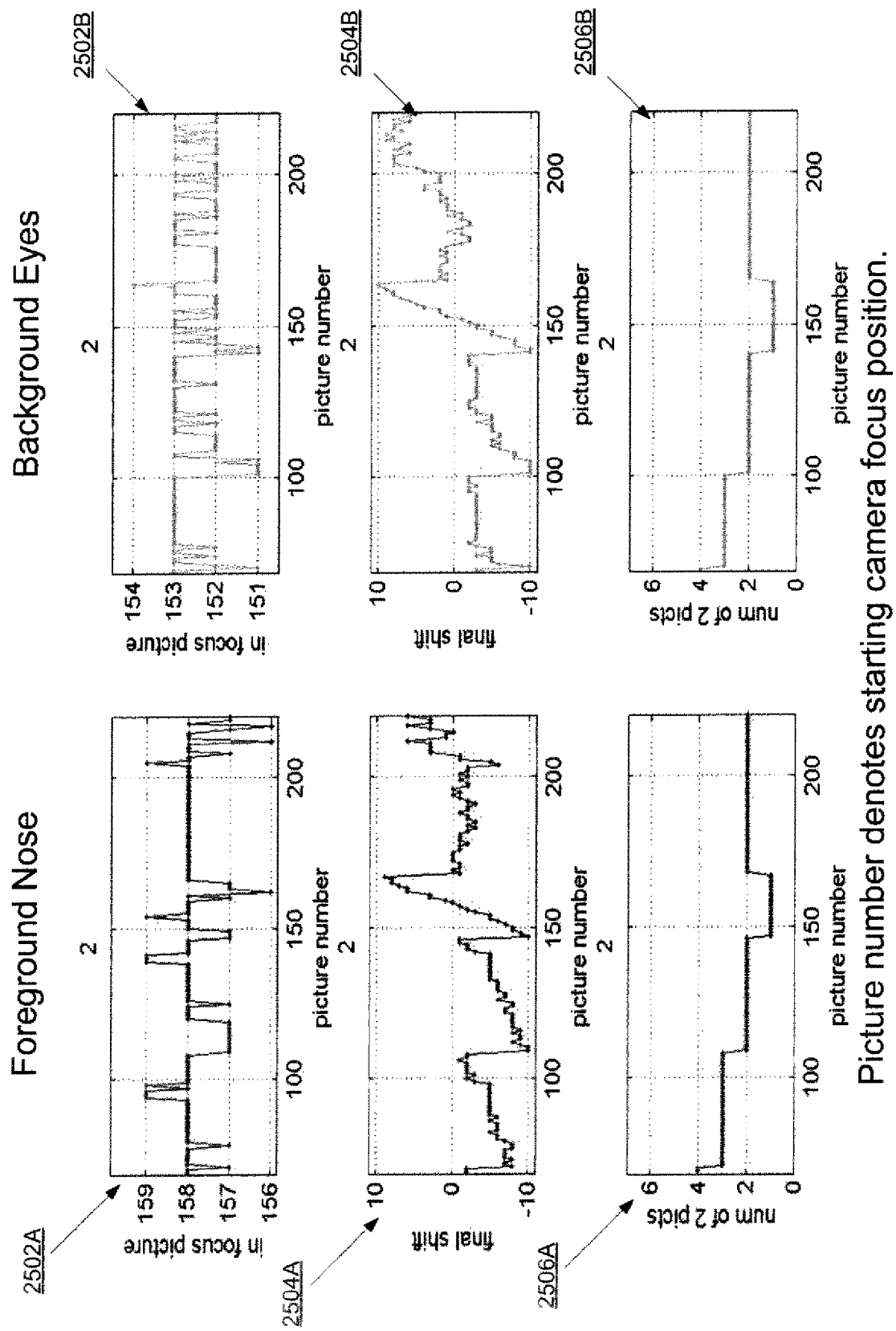

As in FIG. 24, FIG. 25 illustrates in-focus picture graphs 2502A-B, final shift graphs 2504A-B, and number of two pictures needed graphs 2506A-B for the foreground nose and background eyes of mask 2302B. For example, graphs 2502A-B illustrate that the in focus picture varies between 156-159 and 151-153, respectively for the foreground nose and background eyes. Final shift graphs 2504A-B illustrate the shift that occurs right before the lens is moved to the in focus position, respectively for the foreground nose and background eyes of mask 2302B. As in FIG. 24, the number of two picture pairs needed varies from 1-4 for the foreground nose and background eyes of mask 2302B.

Figure 26:
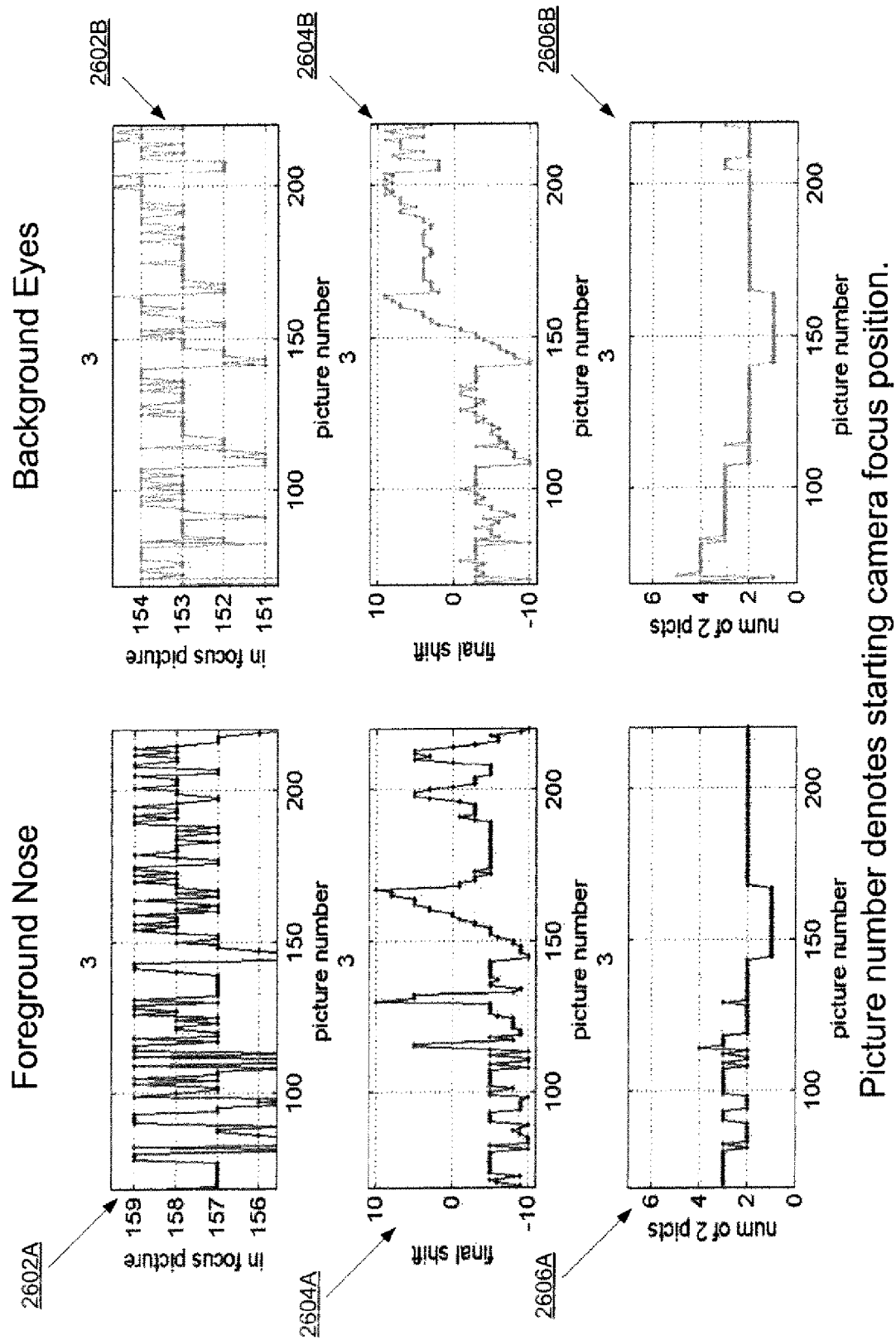

FIG. 26 illustrates in-focus picture graphs 2602A-B, final shift graphs 2604A-B, and number of two pictures needed graphs 2606A-B for the foreground nose and background eyes of mask 2302C. For example, graphs 2602A-B illustrate that the in focus picture varies between 155-159 and 151-154, respectively for the foreground nose and background eyes. Final shift graphs 2604A-B illustrate the shift that occurs right before the lens is moved to the in focus position, respectively for the foreground nose and background eyes of mask 2302C. The number of two picture pairs needed varies from 1-5 for the foreground nose and background eyes of mask 2302C.

Figure 27:
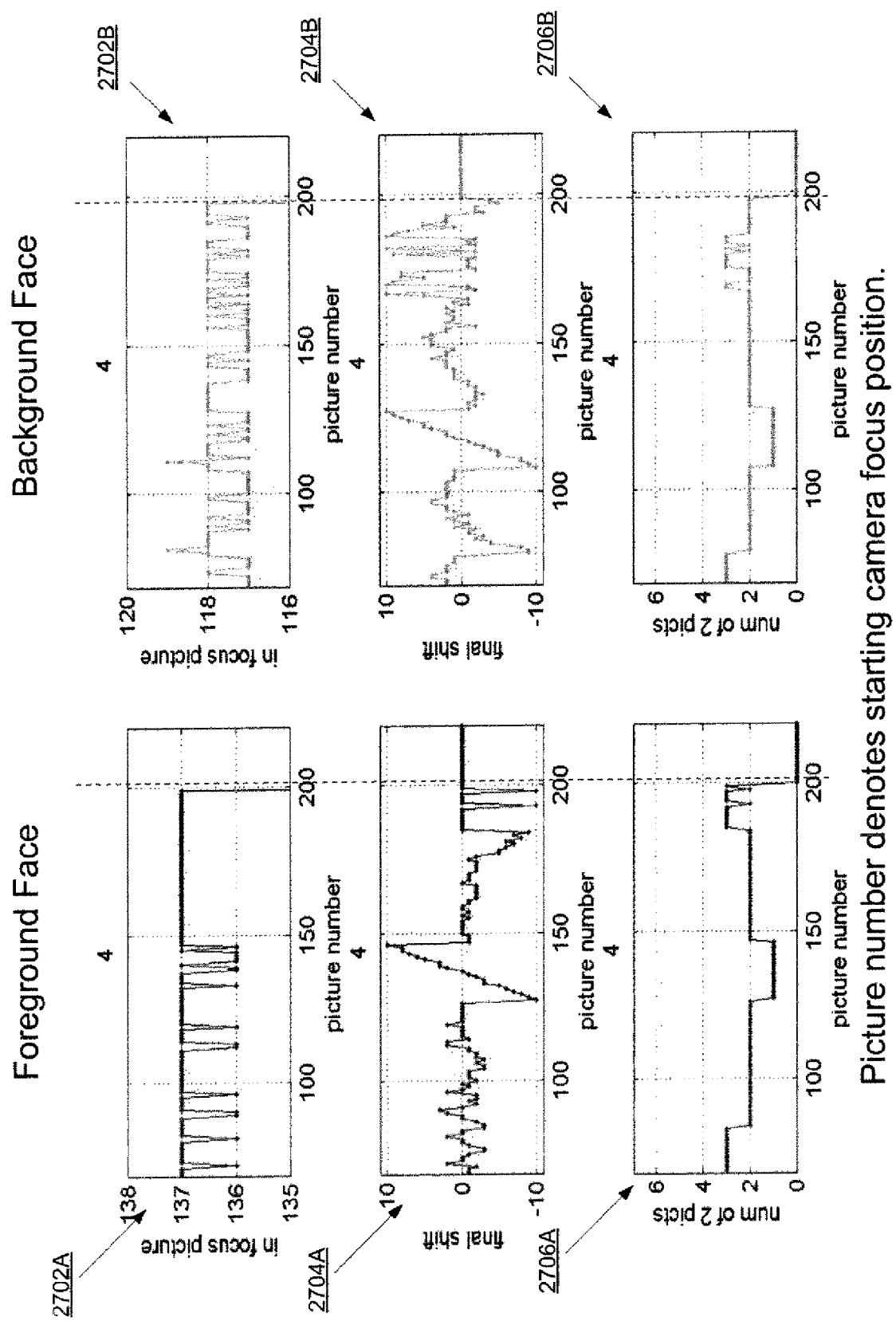

FIG. 27 illustrates in-focus picture graphs 2702A-B, final shift graphs 2704A-B, and number of two pictures needed graphs 2706A-B for the foreground and background faces of mask 2302D. For example, graphs 2702A-B illustrate that the in focus picture varies between 136-137 and 117-119, respectively for the foreground and background faces. Final shift graphs 2704A-B illustrate the shift that occurs right before the lens is moved to the in focus position, respectively for the foreground and background faces of mask 2302D. The number of two picture pairs needed varies from 1-3 for the foreground nose and background eyes of mask 2302D.

Figure 28:
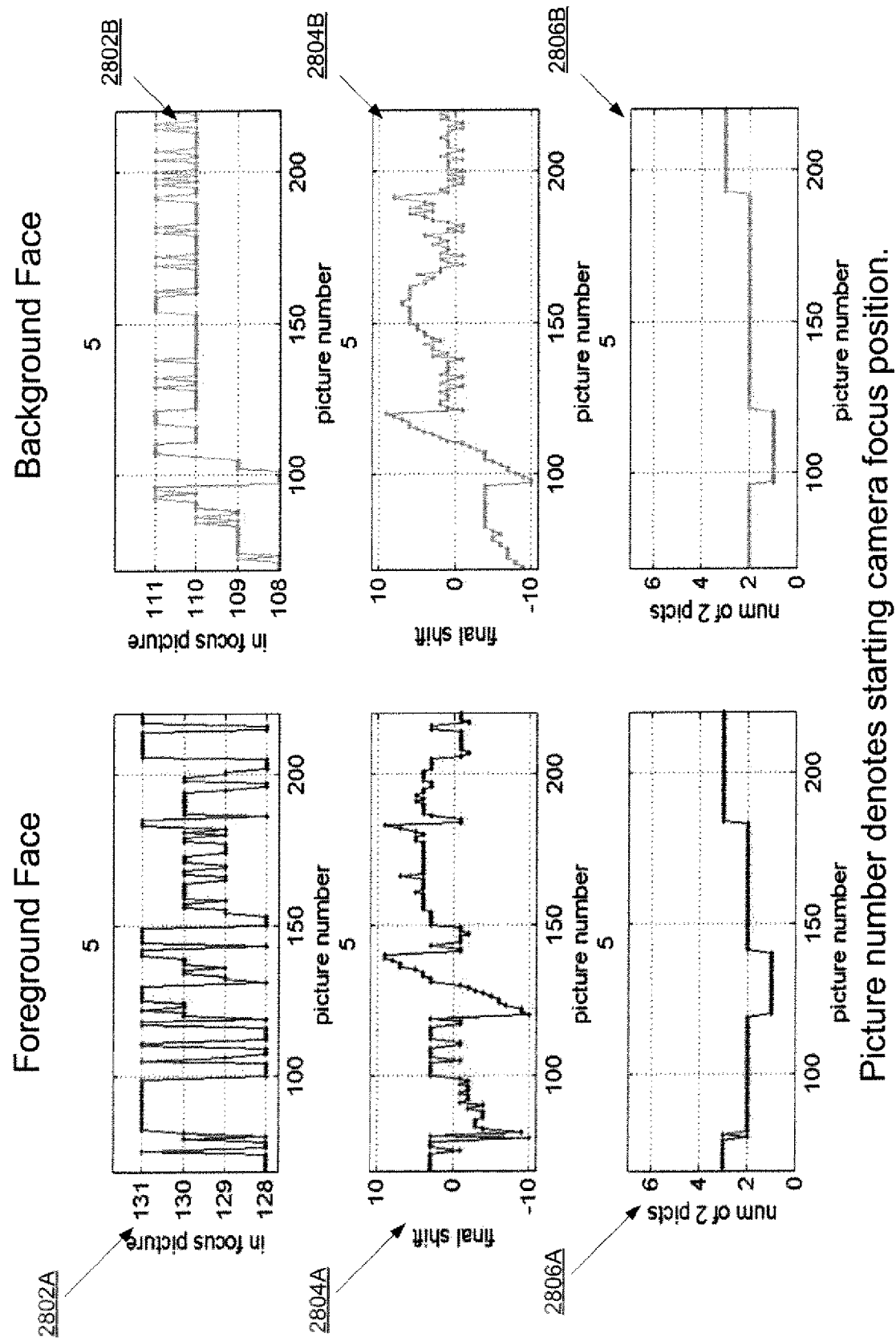

FIG. 28 illustrates in-focus picture graphs 2802A-B, final shift graphs 2804A-13, and number of two pictures needed graphs 2806A-B for the foreground and background faces of mask 2302E. For example, graphs 2802A-B illustrate that the in focus picture varies between 128-131 and 108-111, respectively for the foreground and background faces. Final shift graphs 2804A-B illustrate the shift that occurs right before the lens is moved to the in focus position, respectively for the foreground and background faces of mask 2302E. The number of two picture pairs needed varies from 1-3 for the foreground nose and background eyes of mask 2302E.

Figure 29:
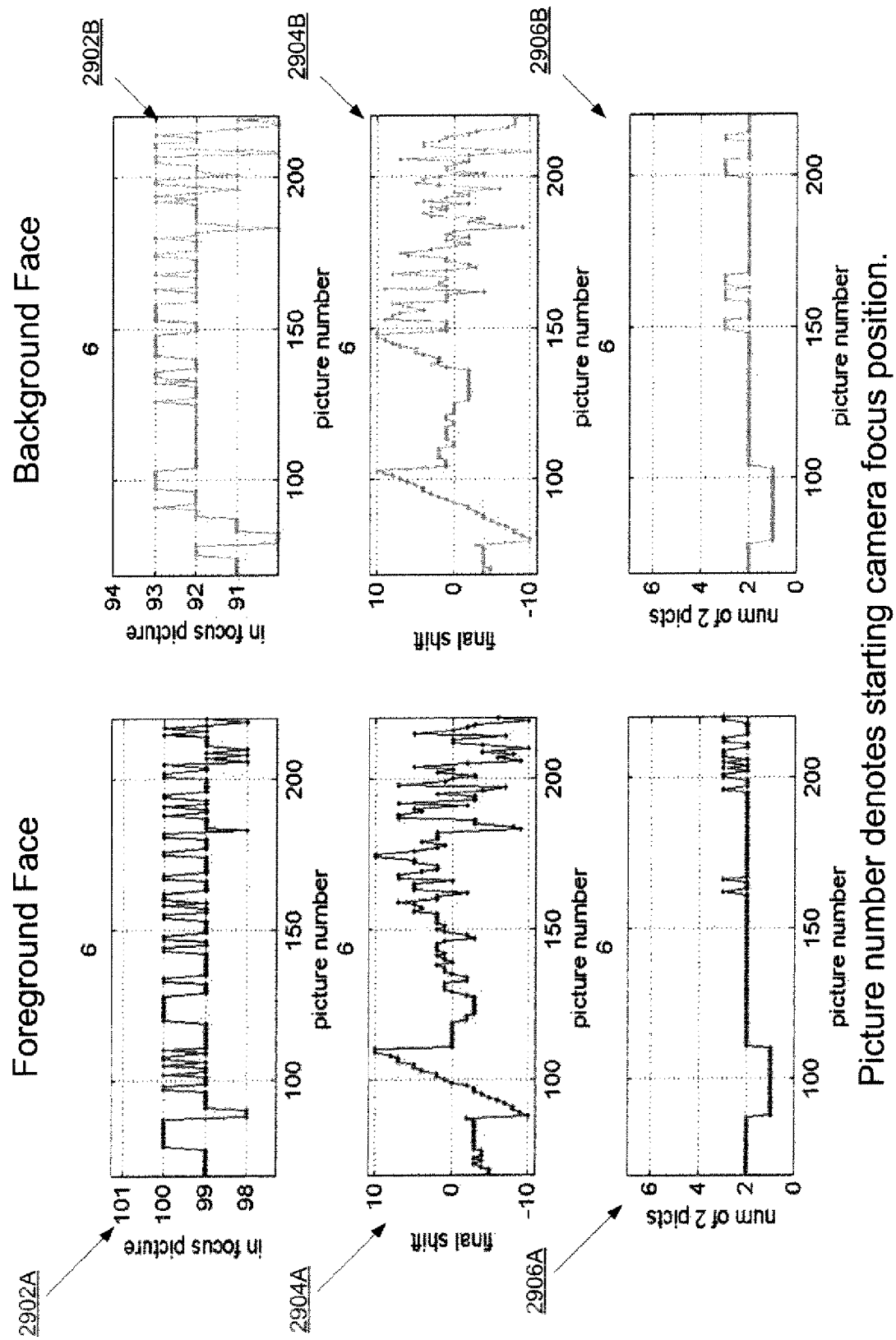

FIG. 29 illustrates in-focus picture graphs 2902A-B, final shift graphs 2904A-B, and number of two pictures needed graphs 2906A-B for the foreground and background faces of mask 2302F. For example, graphs 2902A-B illustrate that the in focus picture varies between 98-100 and 90-93, respectively for the foreground and background faces. Final shift graphs 2904A-B illustrate the shift that occurs right before the lens is moved to the in focus position, respectively for the foreground and background faces of mask 2302F. The number of two picture pairs needed varies from 1-3 for the foreground nose and background eyes of mask 2302F.

Figure 30:
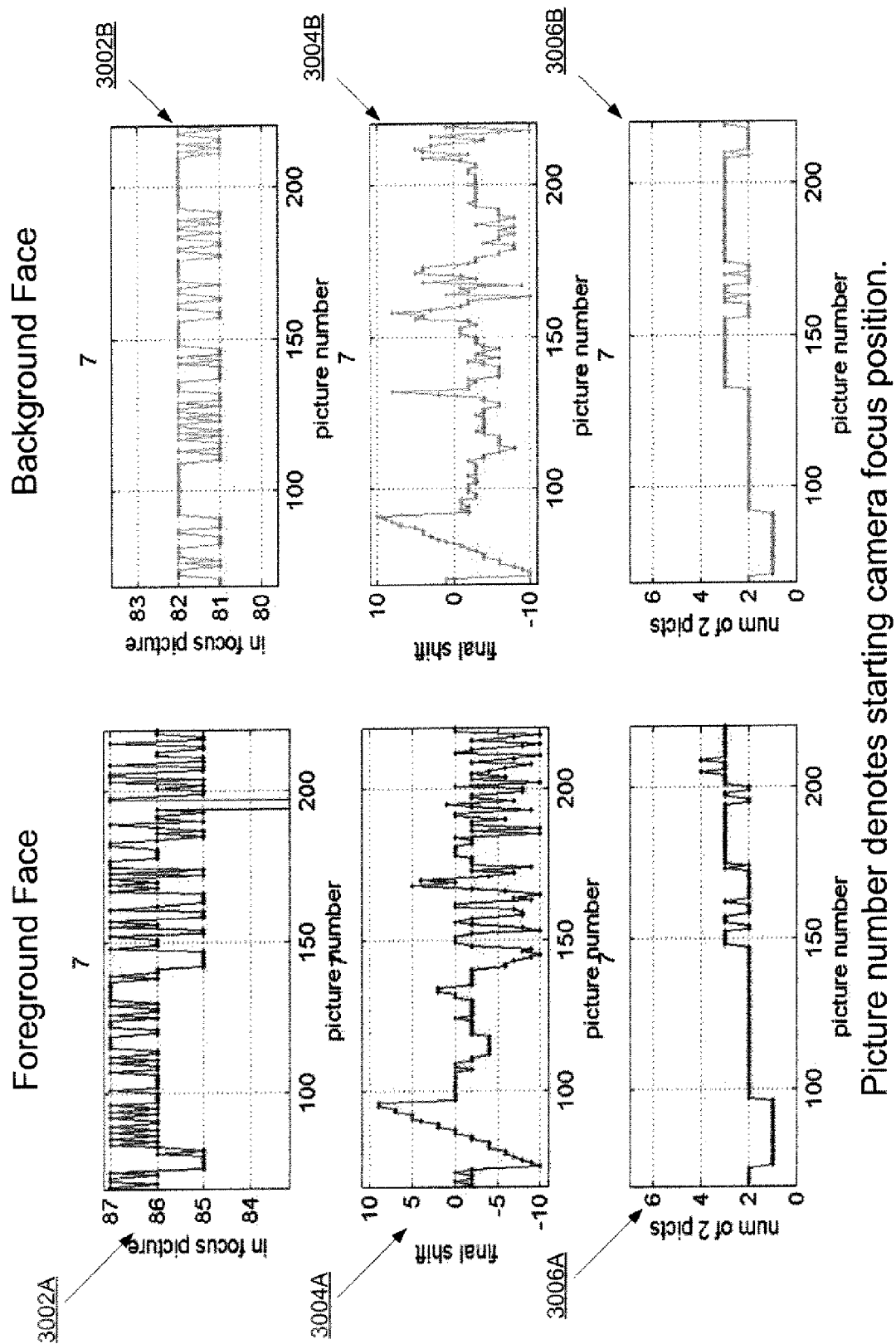

FIG. 30 illustrates in-focus picture graphs 3002A-B, final shift graphs 3004A-B, and number of two pictures needed graphs 3006A-B for the foreground and background faces of mask 2302G. For example, graphs 3002A-B illustrate that the in focus picture varies between 85-87 and 81-82, respectively for the foreground and background faces. Final shift graphs 3004A-B illustrate the shift that occurs right before the lens is moved to the in focus position, respectively for the foreground and background faces of mask 2302G. The number of two picture pairs needed varies from 1-3 for the foreground nose and background eyes of mask 2302G.

Figure 31:
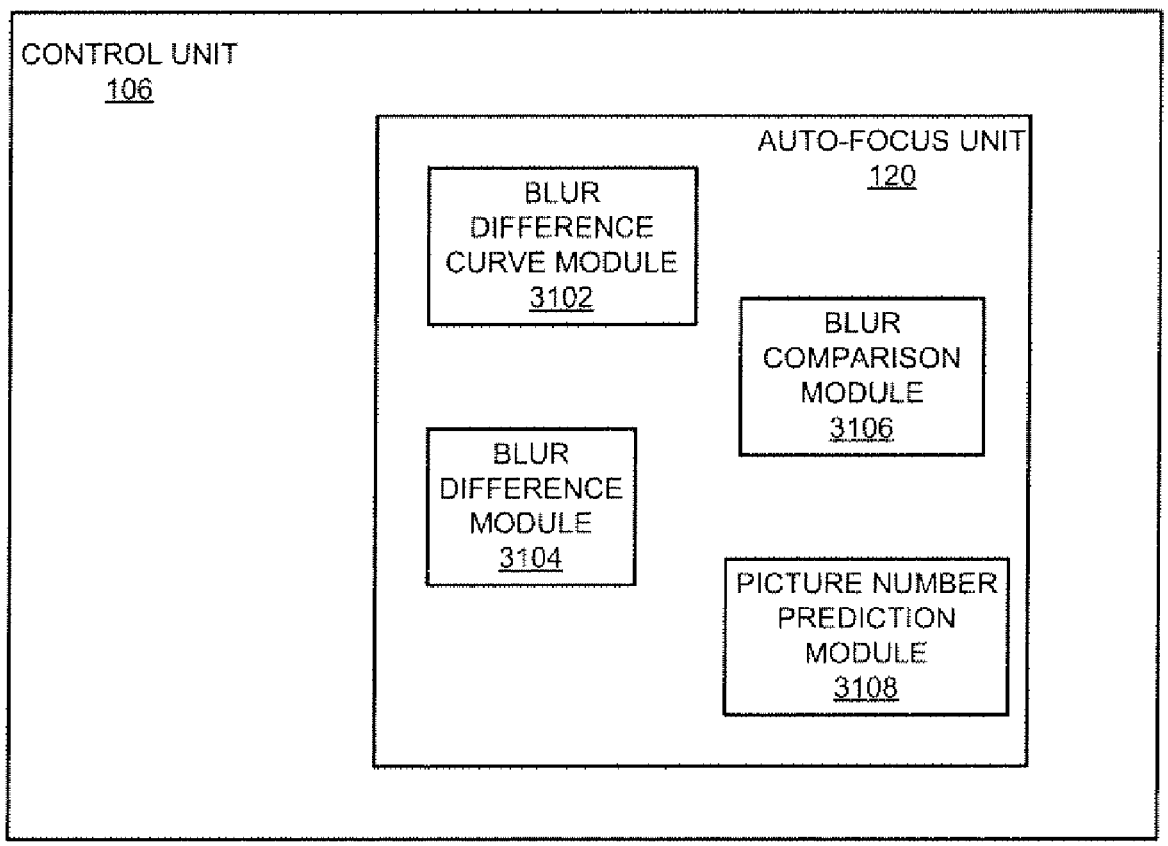
FIG. 31 is a diagram illustrating one embodiment of an image device control unit that includes an auto-focus unit.

FIG. 31 is a block diagram illustrating one embodiment of an image device control unit that computes parameters used to auto-focus a lens, such as lens 102 in camera 100 described in FIG. 1. In one embodiment, image control unit 106 contains auto-focus unit 120. Alternatively, image control unit 106 does not contain auto-focus unit 120, but is coupled to auto-focus unit 120. Auto-focus unit 120 comprises blur difference curve module 3102, blur difference module 3104, blur comparison module 3106, and picture number prediction module 3108. Blur difference curve module 3102 selects blur difference reference curve as described in FIG. 6, at block 606. Blur difference module 3104 computes the blur difference as described in FIG. 6, at block 604 and FIG. 4. Blur comparison module compares the blur difference between two pictures as described in FIG. 6, block 605. Picture number prediction module 3108 predicts the next picture number as described with reference to FIG. 6, block 607.

Figure 33:
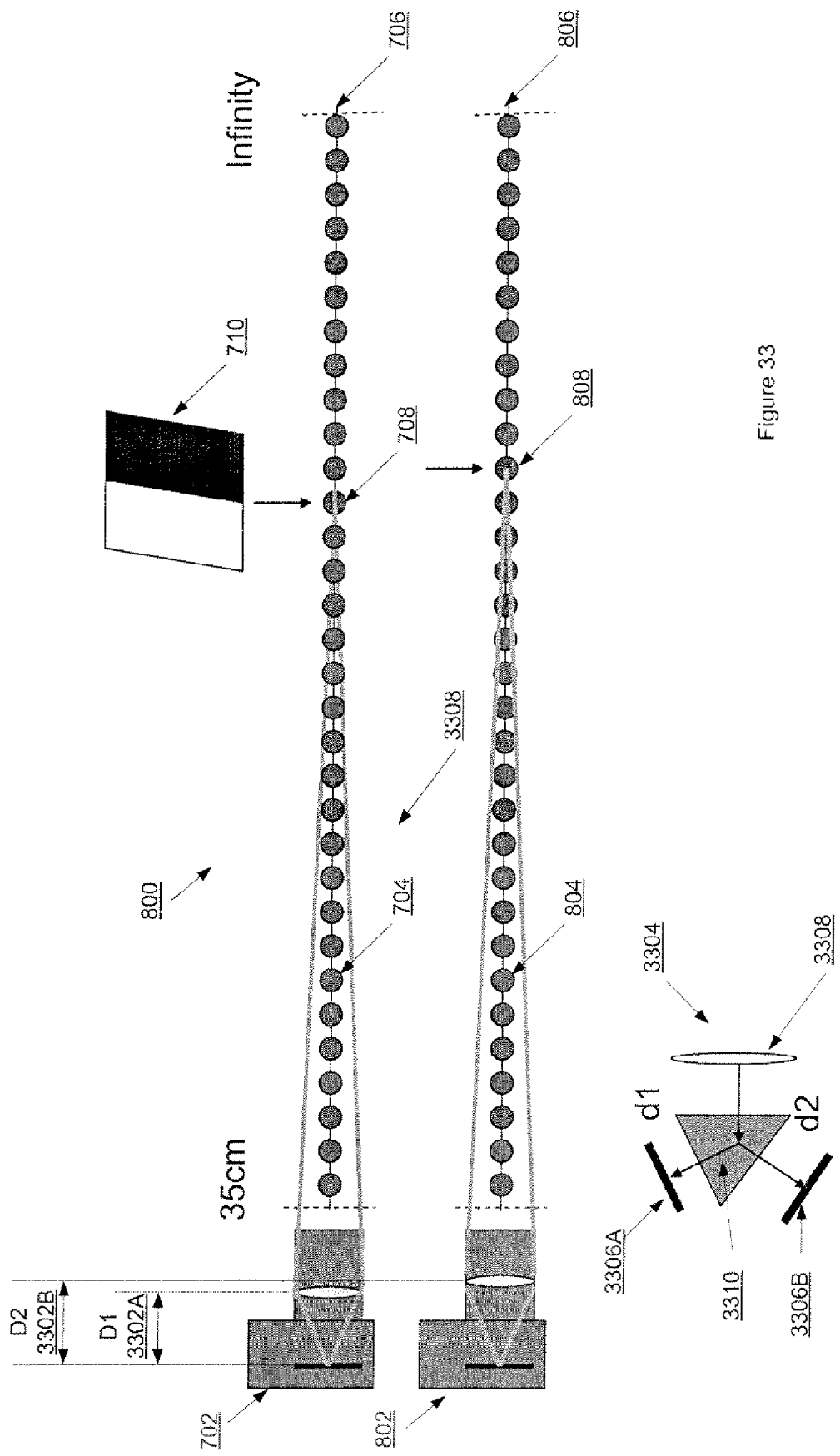
FIG. 33 is a block diagram illustrating one embodiment of an imaging system that computes the blur difference between two pictures of a test image using two sensors at different focusing distances from the test subject.

FIG. 33 is a diagram illustrating one embodiment of an imaging system 3304 that computes the blur difference between two pictures of a test image using two sensors 3306AB at different focusing distances from the test subject. In FIG. 33, imaging system 3304 comprises lens 3308, splitter 3310, and sensors 3306AB. Sensors 3306AB are at distances 3302AB from lens 3308, respectively. Because sensors 3306AB have different focusing distances, each sensor acquires a picture with different focal properties. In this embodiment, imaging system 3304 can acquire images at adjacent pictures number as described with reference to FIG. 8, above. Therefore, imaging system can utilize method 600 as described in FIG. 6 above to auto-focus imaging system 3304 with sensors 3306AB. Computing the blur difference for two images acquired by a two sensor imaging device is further described in "Method of and apparatus for simultaneously capturing and generating multiple blurred images", U.S. Patent Publication No. 2007/0189750 and "REDUCED HARDWARE IMPLEMENTATION FOR A TWO-PICTURE DEPTH MAP ALGORITHM", application Ser. No. 12/111,548.

Figure 32A:
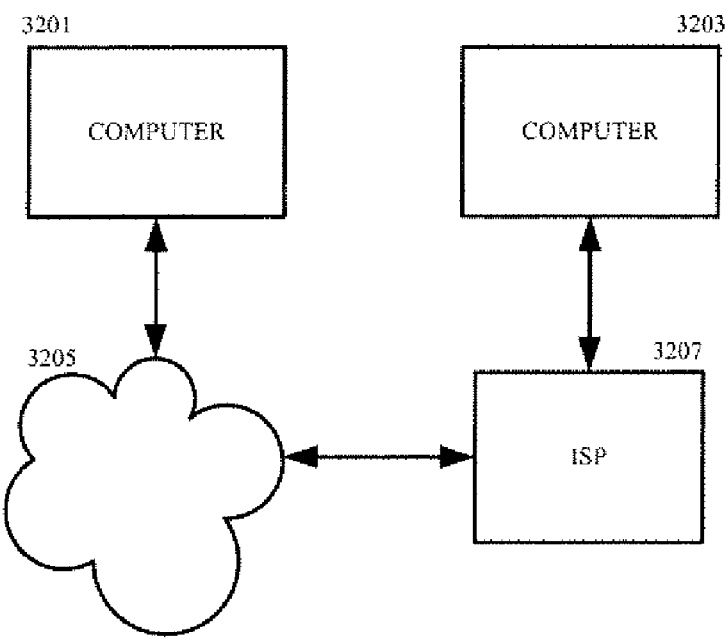
FIG. 32A is a diagram of one embodiment of an operating environment suitable for practicing the present invention.

In one embodiment, as shown in FIG. 32A, a server computer 3201 is coupled to, and provides data through, the Internet 3205. A client computer 3203 is coupled to the Internet 3205 through an ISP (Internet Service Provider) 3205 and executes a conventional Internet browsing application to exchange data with the server 3201. In one embodiment, client 3203 and/or server 3205 can control the auto-focusing of a coupled camera and/or lens using the fast auto-focus method described in FIG. 6 or 18. Optionally, the server 3201 can be part of an ISP which provides access to the Internet for client systems. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet allows users of client computer systems to exchange information, receive and send e-mails, view documents, such as documents which have been prepared in the HTML format, and receive content. It is readily apparent that the present invention is not limited to Internet access and Internet web-based sites; directly coupled and private networks are also contemplated.

Figure 32B:
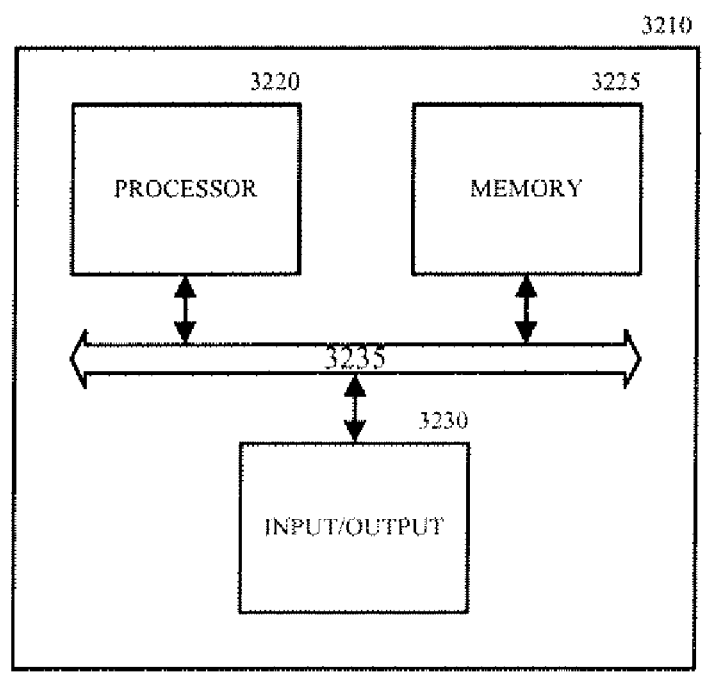
FIG. 32B a diagram of one embodiment of a computer system suitable for use in the operating environment of FIG. 322A.

One embodiment of a computer system suitable for use as server 3201 is illustrated in FIG. 32B. The computer system 3210, includes a processor 3220, memory 3225 and input/output capability 3230 coupled to a system bus 3235. The memory 3225 is configured to store instructions which, when executed by the processor 3220, perform the methods described herein. The memory 3225 may also store data for a fast auto-focus mechanism. Input/output 3230 provides for the delivery and display of the data for a fast auto-focus mechanism or portions or representations thereof, and also the input of data of various types for storage, processing or display. Input/output 3230 also encompasses various types of computer-readable media, including any type of storage device that is accessible by the processor 3220. One of skill in the art will immediately recognize that the server 3201 is controlled by operating system software executing in memory 3225. Input/output 3230 and related media store the machine-executable instructions for the operating system and methods of the present invention as well as the data for a fast auto-focus mechanism.

The description of FIGS. 32A-B is intended to provide an overview of computer hardware and other operating components suitable for implementing the invention, but is not intended to limit the applicable environments. It will be appreciated that the computer system 3240 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computerized method comprising:
    computing a blur difference between a first and a second image of a three-dimensional scene, the first image acquired through a camera lens focused at a first picture number and the second image acquired through the camera lens focused at a second picture number, wherein the first and second picture numbers represent different focus distances of the camera lens;
    retrieving a blur difference curve from one of a plurality of stored blur difference curves, wherein each of the plurality of stored blur difference curves is associated with a different picture number; and
    predicting a third picture number based on the computed blur difference, wherein the third picture number is subsequently used to autofocus the camera lens on the three dimensional scene and the predicting is further based on the blur difference curve associated with the first picture number.

2. The computerized method of claim 1, further comprising:
    determining the blur difference curve using the computed blur difference.

3. The computerized method of claim 1, wherein the computing a blur difference is further based on using an image mask.

4. The computerized method of claim 1, wherein the computing a blur difference comprises:
    convolving the first image into the second image with a blur kernel.

5. The computerized method of claim 1, wherein the first picture number is a picture number at one of a minimal focus distance and an infinite focus distance.

6. The computerized method of claim 1, wherein the first picture number is predicted from a blur difference of a third and fourth image.

7. The computerized method of claim 1, wherein the second picture number is adjacent to the first picture number.

8. A non-transitory machine readable medium having executable instructions to cause a processor to perform a method comprising:
    computing a blur difference between a first and a second image of a three-dimensional scene, the first image acquired through a camera lens focused at a first picture number and the second image acquired through the camera lens focused at a second picture number, wherein the first and second picture numbers represent different focus distances of the camera lens;
    retrieving a blur difference curve from one of a plurality of stored blur difference curves, wherein each of the plurality of stored blur difference curves is associated with a different picture number; and
    predicting a third picture number based on the computed blur difference, wherein the third picture number is subsequently used to autofocus the camera lens on the three dimensional scene and the predicting is further based on the blur difference curve associated with the first picture number.

9. The non-transitory machine readable medium of claim 8, further comprising:
    determining the blur difference curve using the computed blur difference.

10. The non-transitory machine readable medium of claim 8, wherein the computing a blur difference comprises:
    convolving the first image into the second image with a blur kernel.

11. An apparatus comprising:
    means for computing a blur difference between a first and a second image of a three-dimensional scene, the first image acquired through a camera lens focused at a first picture number and the second image acquired through the camera lens focused at a second picture number, wherein the first and second picture numbers represent different focus distances of the camera lens;
    means for retrieving a blur difference curve from one of a plurality of stored blur difference curves, wherein each of the plurality of stored blur difference curves is associated with a different picture number; and means for predicting a third picture number based on the computed blur difference, wherein the third picture number is subsequently used to auto-focus the camera lens on the three dimensional scene and the means for predicting is further based on the blur difference curve associated with the first picture number.

12. The apparatus of claim 11, wherein the means for computing a blur difference comprises:

means for convolving the first image into the second image with a blur kernel.

13. A system comprising:

a processor;

a memory coupled to the processor though a bus; and a process executed from the memory by the processor to cause the processor to compute a blur difference between a first and a second image of a three-dimensional scene, the first image acquired through a camera lens focused at a first picture number and the second image acquired through the camera lens focused at a second picture number, wherein the first and second picture numbers represent different focus distances of the camera lens, to retrieve a blur difference curve from one of a plurality of stored blur difference curves, wherein each of the plurality of stored blur difference curves is associated with a different picture number and predict a third picture number based on the computed blur difference, wherein the third picture number is subsequently used to autofocus the camera lens on the three dimensional scene and the predict is further based on the blur difference curve associated with the first picture number.

* * * * *